US008729003B2

(12) United States Patent
Gallucci et al.

(10) Patent No.: US 8,729,003 B2
(45) Date of Patent: May 20, 2014

(54) PROCESSES AND COMPOSITIONS FOR CLEANING MIXING DEVICES TO IMPROVE POLYCARBONATE PRODUCTION

(71) Applicant: SABIC Innovative Plastics IP B.V., Bergen op Zoom (NL)

(72) Inventors: Robert Russell Gallucci, Mount Vernon, IN (US); Franklin Ehrensbeck, Evansville, IN (US)

(73) Assignee: Sabic Innovative Plastics IP B.V. (NL)

( * ) Notice: Subject to any disclaimer, the term of this patent is extended or adjusted under 35 U.S.C. 154(b) by 0 days.

(21) Appl. No.: 13/774,498

(22) Filed: Feb. 22, 2013

(65) Prior Publication Data
US 2013/0225465 A1 Aug. 29, 2013

Related U.S. Application Data

(60) Provisional application No. 61/604,070, filed on Feb. 28, 2012, provisional application No. 61/659,766, filed on Jun. 14, 2012.

(51) Int. Cl.
C11D 3/37 (2006.01)
C11D 1/22 (2006.01)

(52) U.S. Cl.
USPC .......... 510/188; 510/426; 510/451; 524/523

(58) Field of Classification Search
USPC ................. 510/188, 426, 451; 524/523
See application file for complete search history.

(56) References Cited

U.S. PATENT DOCUMENTS

| | | | |
|---|---|---|---|
| 3,803,085 A | 4/1974 | Takehoshi et al. | |
| 3,905,942 A | 9/1975 | Takekoshi et al. | |
| 4,176,222 A | 11/1979 | Cinderey et al. | |
| 4,838,945 A * | 6/1989 | Fujii et al. .......................... | 137/7 |
| 4,838,948 A | 6/1989 | Bailey | |
| 4,894,416 A | 1/1990 | Gallucci | |
| 5,087,653 A * | 2/1992 | Obama et al. .................. | 524/158 |
| 5,238,608 A | 8/1993 | Obama et al. | |
| 5,719,233 A | 2/1998 | Gallucci et al. | |
| 5,723,539 A | 3/1998 | Gallucci et al. | |
| 6,235,821 B1 * | 5/2001 | Saito ............................. | 524/161 |
| 6,545,089 B1 | 4/2003 | DeRudder et al. | |
| 6,605,659 B2 | 8/2003 | Blackburn et al. | |
| 7,041,773 B2 | 5/2006 | Gallucci et al. | |
| 7,300,742 B2 | 11/2007 | Gallucci et al. | |
| 8,029,717 B2 | 10/2011 | Nakamura et al. | |
| 8,034,857 B2 | 10/2011 | Kailasam et al. | |
| 8,119,761 B2 | 2/2012 | Crawford et al. | |
| 2009/0118406 A1 * | 5/2009 | Tomoda ........................ | 524/284 |
| 2012/0095141 A1 * | 4/2012 | Tanabe et al. ................. | 524/126 |
| 2012/0142835 A1 * | 6/2012 | Wakita .......................... | 524/158 |

FOREIGN PATENT DOCUMENTS

| | | |
|---|---|---|
| DE | 102007015214 A1 | 10/2008 |
| EP | 0399445 A1 | 11/1990 |
| JP | 2003276072 A | 9/2003 |

OTHER PUBLICATIONS

Japanese Patent No. 02-206635 (A); Publication Date: Aug. 16, 1990; Abstract Only; 1 Page.
Japanese Patent No. 05-098072 (A); Publication Date: Apr. 20, 1993; Abstract Only; 1 Page.
Chan et al.; "Facile Quantitative Analysis of Hydroxyl End Groups of Poly(2,6-dimethyl-1,4-phenylene oxide)s by 31P NMR Spectroscopy"; Macromolecules; vol. 27; 1994; pp. 6371-6375.
Chao; "A 31P NMR Study of Poly(phenylene oxide) (PPO)(1) Resin's Hydroxyl End Groups"; Polymer Bulletin; vol. 17; 1987; pp. 397-401.
German Patent No. 102007015214 (A1); Publication Date: Oct. 2, 2008; Abstract Only; 1 Page.
Japanese Patent No. 2006219568 (A); Publication Date: Aug. 24, 2006; Abstract Only; Document No. XP-002698771; 1 Pages.
Japanese Patent No. 2007119554 (A); Publication Date: May 17, 2007; Abstract Only; Document No. XP-002698862; 1 Page.
Japanese Patent No. 2009143167 (A); Publication Date: Jul. 2, 2009; Abstract Only; Document No. XP-002698770; 1 Pages.
International Search Report; International Application No. PCT/US2013/027127; International Filing Date: Feb. 21, 2013; Date of Mailing: Jun. 25, 2013; 5 Pages.
Written Opinion of the International Searching Authority; International Application No. PCT/US2013/027127; International Filing Date: Feb. 21, 2013; Date of Mailing: Jun. 25, 2013; 6 Pages.
Japanese Patent No. S62117712 (A); Publication Date: May 29, 1987; Abstract Only; Document No. XP-002698863; 1 Page.

* cited by examiner

Primary Examiner — Charles Boyer
(74) Attorney, Agent, or Firm — Cantor Colburn LLP

(57) ABSTRACT

Processes and compositions for cleaning mixing devices are disclosed that improve the production and quality of polycarbonate resins subsequently produced in the mixing device, while reducing the time needed for cleaning and/or change over. A cleaning mixture comprising polycarbonate resin pellets coated with an alkyl aryl sulfonate salt aqueous solution are used to purge the mixing device.

48 Claims, No Drawings

PROCESSES AND COMPOSITIONS FOR CLEANING MIXING DEVICES TO IMPROVE POLYCARBONATE PRODUCTION

CROSS REFERENCE TO RELATED APPLICATIONS

The present application claims priority to U.S. Provisional Application Ser. No. 61/604,070, filed Feb. 28, 2013, and U.S. Provisional Application Ser. No. 61/659,766, filed Jun. 14, 2012, the contents of which is incorporated herein by reference.

BACKGROUND

The present disclosure relates to processes for cleaning mixing devices that are used to make polycarbonates and polycarbonate blends. The processes aim to increase the speed of the cleaning process, provide lower resin degradation, and allow for a higher overall extrusion rate. The disclosure also relates to purge compositions useful in such processes.

Extruders using a melt conveying screw accomplish a large portion of the melt processing of thermoplastic resins. The extruder can be used for compounding, molding, pelletization or forming films, sheets or profiles. Such extruders typically have a heated extrusion barrel and one or two screws revolving within the barrel to compress, melt, and extrude the resin through an orifice in an extrusion nozzle. The barrel is divided into several different zones, such as feed, transition, mixing, dispersion, and metering zones. When such machines are dedicated to making a single material in a single color, they can be very efficient. However, when the same machine is used to make a variety of materials and/or colors, there is a need to changeover or switch between materials (i.e. changeover process). Otherwise, impurities or residues created during the extrusion of the first, preceding resin can contaminate the second, succeeding resin. During this changeover process, the extruder produces a combination of the preceding material/color and the succeeding material/color. As a result, the combination may not meet desired specifications, e.g. compositional differences, a loss of clarity, a change in color or viscosity, or some other defect. In addition, the changeover process leads to a loss of material and a decrease in manufacturing efficiency.

These deficiencies have been addressed to some extent in several ways. For instance, a high viscosity or sticky resin has been used to push out the old material. While this can be effective, the high viscosity resin itself must be pushed out of the machine, leading to inefficiency. In other instances, fiber glass reinforced resins are used as a purge compound to clean out the extruder. While effective in some systems, this process again leaves the problem of removing the fiber glass resin itself.

In other instances, carboxylic acid salts, fatty acid soaps, ammonium salts, amines, alcohols, alcohol sulfate salts and other chemical compounds or mixtures have been used to help clean out (purge) the extruder during changeover. For example, common laundry detergents like WISK® detergent and TIDE® detergent (which contain alcohols and carboxylic acid salts) are commonly used as purge compounds both in compounding and sheet extrusion. These detergents can also have a pH of 9 to 12.

However, such chemical compounds cannot be used effectively when the subsequent material is a polycarbonate resin or a blend containing polycarbonate resin. Polycarbonate is very susceptible to degradation, such as a change in color (i.e. color formation), loss of molecular weight, reduced chemical and mechanical properties, and/or surface appearance defects (e.g. splay in molded parts), due to the catalytic effects of acid or base. The use of carboxylic acid salts, fatty acid soaps, ammonium salts, and amines cause such degradation in the resulting polycarbonate material. If even a small amount of such an unsuitable material, such as a high (greater than 9.0) pH detergent, remains in the feeder or extruder, the polycarbonate (PC) resin used to clean the machine as well as the new polycarbonate will be degraded and the melt viscosity will drop. Foaming can also occur. Therefore in addition to loss of machine production time during a purge, there is degradation of the new polycarbonate material to be made, which reduces its utility. Put another way, detergents containing such materials themselves become a source of contamination of the subsequent polycarbonate material in addition to degrading the PC purge resin.

Thus, there exists a need for processes and compositions to quickly changeover a screw-based melt processing machine from one material to a polycarbonate-containing material in a short period of time, with no degradation of the polymer. Desirably, the process/composition should be applicable for cleaning a wide variety of contaminants, especially colorants such as carbon black, titanium dioxide, anthraquinone and phthalocyanine-based pigments and dyes.

BRIEF DESCRIPTION

The present disclosure relates to the discovery that the use of an alkyl aryl sulfonate salt in a cleaning mixture in combination with pelletized polycarbonate is effective in cleaning the mixing device. The cleaning time is surprisingly faster, there is less degradation of polycarbonate resin, and extrusion can occur at a higher rate.

Disclosed in embodiments is a process to clean melt processing equipment used to compound, mold or extrude polycarbonate-containing resins. The melt processing equipment is purged with a cleaning mixture (purge mixture) comprising from 50 to 99.5 weight percent (wt %) of polycarbonate resin pellets and from 0.5 to 50 wt % of a liquid or aqueous solution containing an alkyl aryl sulfonate salt. The cleaning/purge mixture can have a pH of 6.0 to 7.9. In other instances, the pH can be from 6.5 to 7.5, or in yet other instances the pH can be slightly acidic from 6.0 to 6.9. The melt processing equipment is heated to a temperature of 250 to 380 degrees Celsius (° C.). The cleaning mixture is then run through the equipment. The resulting PC purge resin after extrusion (formed from the pellets in the cleaning mixture) can have a weight average molecular weight (Mw) within 30% of the polycarbonate resin pellets before purging and a phenolic end group content of 100 parts per million by weight (ppm) or less. After the purge mixture is run through the equipment, the equipment can be further cleansed with a clean out resin that comprises a polycarbonate resin but contains no alkyl aryl sulfonate salt additive.

Also disclosed in embodiments is a process for cleaning a mixing device containing a polymeric residue. The mixing device is contacted with a cleaning mixture comprising at least one polycarbonate resin pellet and an alkyl aryl sulfonate salt (provided as a solution or liquid). The cleaning mixture is then run through the mixing device to remove the polymeric residue, which can be in the form of colorants, flame retardants, impact modifiers and the like.

Also disclosed is a cleaning mixture comprising an alkyl aryl sulfonate salt, polycarbonate resin pellets, and water.

These and other non-limiting characteristics are more particularly described below.

DETAILED DESCRIPTION

The present disclosure can be understood more readily by reference to the following detailed description of desired embodiments and the examples included therein. In the following specification and the claims which follow, reference will be made to a number of terms which shall be defined to have the following meanings.

The singular forms "a," "an," and "the" include plural referents unless the context clearly dictates otherwise.

As used in the specification and in the claims, the term "comprising" can include the embodiments "consisting of" and "consisting essentially of."

Numerical values in the specification and claims of this application, particularly as they relate to polymers or polymer compositions, reflect average values for a composition that can contain individual polymers of different characteristics. Furthermore, unless indicated to the contrary, the numerical values should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 grams to 10 grams" is inclusive of the endpoints, 2 grams and 10 grams, and all the intermediate values). The endpoints of the ranges and any values disclosed herein are not limited to the precise range or value; they are sufficiently imprecise to include values approximating these ranges and/or values.

As used herein, approximating language can be applied to modify any quantitative representation that can vary without resulting in a change in the basic function to which it is related. Accordingly, a value modified by a term or terms, such as "substantially," may not be limited to the precise value specified, in some cases. In at least some instances, the approximating language can correspond to the precision of an instrument for measuring the value.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, the aldehyde group —CHO is attached through the carbon of the carbonyl group.

The term "alkyl" refers to a linear or branched array of atoms that is composed exclusively of carbon and hydrogen. The array of atoms can include single bonds, double bonds, or triple bonds (typically referred to as alkane, alkene, or alkyne). Alkyl groups can be substituted (i.e. one or more hydrogen atoms is replaced) or unsubstituted. Exemplary alkyl groups include, but are not limited to, methyl, ethyl, and isopropyl.

The term "aryl" refers to an array of atoms having a valence of at least one and comprising at least one aromatic group. The array of atoms can include heteroatoms such as sulfur, and oxygen, or can be composed exclusively of carbon and hydrogen. Aromatic groups are not substituted. Exemplary aromatic groups include, but are not limited to, phenyl, naphthyl, biphenyl, and diphenyl ether.

In the definitions above, the term "substituted" refers to at least one hydrogen atom on the named radical being substituted with another functional group, such as alkyl, halogen, —OH, —CN, —NO$_2$, —COOH, etc.

It has been found that an alkyl aryl sulfonate salt can be used to clean or purge mixing devices. Such devices are typically used to compound, mold, or extrude resin. After cleaning/purging, the device can be used for processing of a subsequent polycarbonate resin without degrading the polycarbonate resin.

In embodiments, the cleaning mixture/purge mixture used for cleaning/purging comprises the alkyl aryl sulfonate salt, at least one polycarbonate resin pellet, and water. The cleaning mixture has a pH of from 6.0 to 7.9. The cleaning mixture should be free of (i.e. contain less than 50 ppm of) carboxylic acid salts, fatty acid salts, ammonium salts, amines, carbonate salts, and bicarbonate salts. The cleaning mixture can be run through the mixing device to remove polymeric residue, contaminants, or colorants present in the device.

The cleaning mixture containing liquid and pellets described herein can be used as a purging solution for any type of mixing device, including compound extruders, sheet and film extruders, molding machines, and any other device which can be used to melt process polycarbonates. The purging processes of this disclosure are especially useful in screw conveying continuous melt processing equipment such as extruders, including compounding equipment, melt pumps, injection molding machines, extruders (such as film, sheet, and profile extruders) and blow molding machines. The cleaning mixture is especially effective in intermeshing twin screw extruders. The term "mixing device" is used herein to refer to any such device that can be used in the processing of polycarbonates. In some instances, the melt processing device is a single or twin screw extruder with a screw length/diameter (L/D) ratio from 20:1 to 40:1 and a screw diameter from 0.5 to 8.0 inches. In other instances, the melt processing device is a single screw extruder having a screw diameter from 0.5 to 8.0 inches that is part of a thermoplastic molding machine. In other instances, the single screw melt processing device is a molding machine that is at least one of the following; an injection molding machine, a blow molding machine, an injection-blow molding machine, an extrusion-blow molding machine, a stretch-blow molding machine, a gas assist molding machine, a hydraulic molding machine, a mechanical molding machine, and an electric molding machine.

The alkyl aryl sulfonate salt can have the general structure of Formula (A):

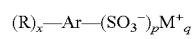    Formula (A)

wherein each R is independently alkyl having from 1 to 36 carbon atoms; x is an integer indicating the number of R groups, and is from 1 to 10; M is an alkali metal or alkaline earth metal cation; p is the number of sulfonate groups; and q is the number of cations required to neutralize the sulfonate groups. In certain embodiments, p is from 1 to 3, and q is also from 1 to 3. The sulfonate salt group is directly bonded to an aromatic ring. At least one alkyl group is present in the alkyl aryl sulfonate salt. In more particular embodiments, the at least one alkyl group contains from 6 to 36 carbon atoms.

The alkyl aryl sulfonate salt generally contains one or more alkali metal or alkaline earth metal cations. Exemplary cations include sodium (Na$^+$), potassium (K$^+$), magnesium (Mg$^{2+}$), calcium (Ca$^{2+}$), and mixtures thereof. Similarly, the sulfonate salt can contain one, two, three, or more sulfonate groups.

In embodiments, the aryl group of the sulfonate salt is a phenyl, naphthyl, biphenyl, or diphenyl ether group. Salts having these aryl groups are depicted below as Formulas (B), (C), (D), and (E):

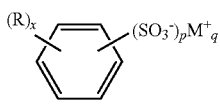

alkyl benzene sulfonate salt  Formula (B)

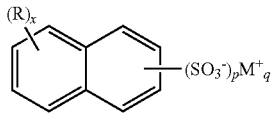

alkyl naphthalene sulfonate salt  Formula (C)

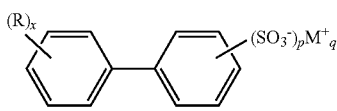

alkyl biphenyl sulfonate salt  Formula (D)

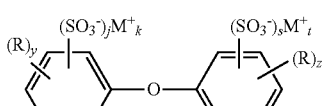

alkyl diphenyl ether sulfonate salt  Formula (E)

wherein R, M, p, and q are as previously described; y+z is from 1 to 5; and j+s is from 1 to 3. In certain embodiments, y=0 and s=0, i.e. the alkyl and sulfonate groups are on separate rings in Formula (E).

In specific embodiments of Formula (B), p=q=1. In specific embodiments of Formula (E), j=k=s=t=1 and y=z.

In specific embodiments, the alkyl aryl sulfonate salt is an alkyl benzene sulfonate salt. The sulfonate salt can have the structure of Formula (F):

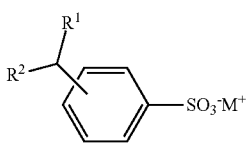

Formula (F)

where M is an alkali metal or alkaline earth metal cation; $R^1$ is an alkyl group containing from 5 to 35 carbon atoms; and $R^2$ is hydrogen or an alkyl group containing from 1 to 12 carbon atoms, with $R^1$ and $R^2$ having no more than 36 total carbon atoms. This type of branched alkyl aryl sulfonate salt is preferred in some instances since the alkyl branching allows for more facile biological degradation if the cleaning solution component of the purge is sent to standard waste water treatment facilities. In specific embodiments, the alkyl aryl sulfonate salt is sodium dodecyl benzene sulfonate.

The alkyl aryl sulfonate salt is typically added to the cleaning mixture as an aqueous solution which contains 0.2 to 50 wt % of the sulfonate salt (based on the weight of the aqueous solution), specifically 0.5 to 50 wt %, more specifically 5 to 50 wt %, even more specifically 10 to 40 wt %, still more specifically 20 to 35 wt %. The aqueous solution can have a pH of 6.0 to 7.9, in other instances 6.0 to 7.0, or 6.0 to 6.9 (i.e. slightly acidic). The alkyl aryl sulfonate salt can be added to the cleaning mixture as an aqueous solution which contains 0.005 to 12 wt % of the sulfonate salt (based on the weight of the aqueous solution), In the preparation of the alkyl aryl sulfonate salt, care should be taken to prevent over neutralization. Over neutralization would result in a pH above 7.0, in some instances higher than 7.9. In some instances the amount of base used to form the salt for the neutralization of the alkyl aryl sulfonic acid should be stoichiometrically less than the alkyl aryl sulfonic acid. For example, the alkyl aryl sulfonic acid should be neutralized to 85.0 to 99.5%.

The cleaning mixture (purge) also includes at least one polycarbonate resin pellet. For purposes of this application, the term "pellet" should be interpreted as referring to a solid material having a minimum length in at least one dimension of at least 2 millimeters (mm). In contrast, a "powder" has a maximum length in any dimension of 2 mm. Pellet size can be measured by any conventional method including physical measurement of a representative group of pellets using a ruler or caliper. Pellet size can also be measured by sieving pellets through a mesh or screen of a known dimension using, for example, ASTM method D1921. When referring to a mixture of polycarbonate solids of varying sizes, the mixture should be considered to be made of pellets if at least 90% of the mixture is retained on a 10 mesh (2.0 mm) screen, while powder will not be retained to the same extent. Polycarbonate pellets will have a high bulk density that is greater than that of powder. In some instances, the PC pellet bulk density will be from 0.50 to 0.90 grams per cubic centimeter (g/cc). Bulk density can be measured in any of various methods known in the art for example ASTM D1895 test methods B and C. The pellet(s) can be of any shape or form. For example, the pellets can be in the shape of cylinders, cubes, hemispheres, ovoids, chunks, rectangles, pyramids, parallelograms or irregular angular shapes. In some instances, the pellets will be cylinders that are on average 2 mm to 6 mm long and 0.5 mm to 4 mm in diameter. In other instances, the pellets can be made from regrind sheet or reground molded parts (including post consumer reground sheet and parts) with a largest dimension of 10 mm. In some instances it can be beneficial to mix small and large pellets together. In yet other instances it can be beneficial to have pellets with at least one sharp angular face, for example cubes and cylinders, rather than spheres or ovoids. In another instance the purge material will have at least one angular face wherein the surfaces defining the angular face meet at an angle of 60 to 120 degrees. In other instances the purge material will have an angular face wherein the surfaces meet at an angle of 80 to 100 degrees.

As used herein, the terms "polycarbonate" and "polycarbonate resin" mean a polymer having repeating structural carbonate units of the formula (1):

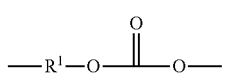

(1)

in which at least 60 percent of the total number of $R^1$ groups are aromatic organic radicals and the balance thereof are aliphatic, alicyclic, or aromatic radicals. An ester unit (—COO—) is not considered a carbonate unit, and a carbonate unit is not considered an ester unit. In one embodiment, each $R^1$ is an aromatic organic radical, for example a radical of the formula (2):

-A¹-Y¹-A²-  (2)

wherein each of $A^1$ and $A^2$ is a monocyclic divalent aryl radical and $Y^1$ is a bridging radical having one or two atoms that separate $A^1$ from $A^2$. In an exemplary embodiment, one atom separates $A^1$ from $A^2$. Illustrative non-limiting examples of radicals of this type are —O—, —S—, —S(O)—, —S(O$_2$)—, —C(O)—, methylene, cyclohexylmethylene, 2-[2.2.1]-bicycloheptylidene, ethylidene, isopropylidene, neopentylidene, cyclohexylidene, cyclopentadecylidene, cyclododecylidene, and adamantylidene. The bridging radical $Y^1$ can be a hydrocarbon group or a saturated hydrocarbon group such as methylene, cyclohexylidene, or isopropylidene.

Polycarbonates can be produced by the interfacial reaction of dihydroxy compounds having the formula HO—$R^1$—OH, wherein $R^1$ is as defined above. Dihydroxy compounds suitable in an interfacial reaction include the dihydroxy compounds of formula (A) as well as dihydroxy compounds of formula (3)

wherein $Y^1$, $A^1$ and $A^2$ are as described above. Also included are bisphenol compounds of general formula (4):

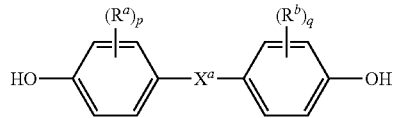

wherein $R^a$ and $R^b$ each represent a halogen atom or a monovalent hydrocarbon group and can be the same or different; p and q are each independently integers of 0 to 4; and $X^a$ represents one of the groups of formula (5):

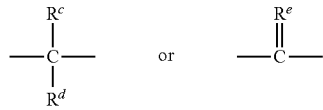

wherein $R^c$ and $R^d$ each independently represent a hydrogen atom or a monovalent linear or cyclic hydrocarbon group and $R^e$ is a divalent hydrocarbon group.

Specific examples of the types of bisphenol compounds that can be represented by formula (3) include 1,1-bis(4-hydroxyphenyl)methane, 1,1-bis(4-hydroxyphenyl)ethane, 2,2-bis(4-hydroxyphenyl)propane (hereinafter "bisphenol-A" or "BPA"), 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxy-t-butylphenyl) propane, and 2-phenyl-3,3-bis(4-hydroxyphenyl)phthalimidine ("PPPBP"). Combinations comprising at least one of the foregoing dihydroxy compounds can also be used.

Branched polycarbonates are also useful, as well as blends of a linear polycarbonate and a branched polycarbonate. The branched polycarbonates can be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane (THPE), isatin-bis-phenol, tris-phenol TC (1,3,5-tris((p-hydroxyphenyl)isopropyl)benzene), tris-phenol PA (4(4(1,1-bis(p-hydroxyphenyl)ethyl)alpha, alpha-dimethyl benzyl)phenol), 4-chloroformyl phthalic anhydride, trimesic acid, and benzophenone tetracarboxylic acid. The branching agents can be added at a level of 0.05 wt % to 2.0 wt %.

The polycarbonate can also be a copolymer in which the resin chain contains both aryl carbonate and ester linkages. The polyester carbonates can have both aromatic and/or aliphatic ester linkages. Exemplary aromatic ester units are derived from isophthalic, terephthalic acids or mixtures thereof. Diacid chlorides derivates are frequently used to make such polyester carbonates with phosgenation in the combination with bis-phenolic compounds. In other instances aliphatic diacids such as sebacic acid, dodecanoic acid, dimer acid or hydrogenated dimer acids are used to prepare aliphatic polyester carbonates copolymers.

"Polycarbonates" and "polycarbonate resin" as used herein further includes blends of polycarbonates as well as copolymers comprising carbonate chain units. An exemplary copolymer is a polyester carbonate, also known as a copolyester-polycarbonate. Such copolymers further contain, in addition to recurring carbonate chain units of the formula (1), repeating units of formula (6)

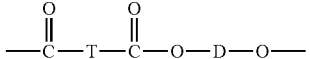

wherein D is a divalent radical derived from a dihydroxy compound, and can be, for example, a $C_{2-10}$ alkylene radical, a $C_{6-20}$ alicyclic radical, a $C_{6-20}$ aromatic radical or a polyoxyalkylene radical in which the alkylene groups contain 2 to 6 carbon atoms, specifically 2, 3, or 4 carbon atoms; and T is a divalent radical derived from a dicarboxylic acid, and can be, for example, a $C_{2-10}$ alkylene radical, a $C_{6-20}$ alicyclic radical, a $C_{6-20}$ alkyl aromatic radical, or a $C_{6-20}$ aromatic radical.

In one embodiment, D is a $C_{2-6}$ alkylene radical. In another embodiment, D is derived from an aromatic dihydroxy compound of formula (7):

wherein each $R^k$ is independently a $C_{1-10}$ hydrocarbon group, and n is 0 to 4. The halogen is usually bromine. Examples of compounds that can be represented by the formula (7) include resorcinol, substituted resorcinol compounds such as 5-methyl resorcinol, 5-phenyl resorcinol, 5-cumyl resorcinol, or the like; catechol; hydroquinone; substituted hydroquinones such as 2-methyl hydroquinone, 2-t-butyl hydroquinone, 2-phenyl hydroquinone, 2-cumyl hydroquinone, 2,3,5,6-tetramethyl hydroquinone, or the like; or combinations comprising at least one of the foregoing compounds.

Examples of aromatic dicarboxylic acids that can be used to prepare the polyesters include isophthalic or terephthalic acid, 1,2-di(p-carboxyphenyl)ethane, 4,4'-dicarboxydiphenyl ether, 4,4'-bisbenzoic acid, and mixtures comprising at least one of the foregoing acids. Acids containing fused rings can also be present, such as in 1,4-, 1,5-, or 2,6-naphthalenedicarboxylic acids. Specific dicarboxylic acids are terephthalic acid, isophthalic acid, naphthalene dicarboxylic acid, cyclohexane dicarboxylic acid, sebacic acid or mixtures thereof.

In other embodiments, poly(alkylene terephthalates) can be used in a blend with polycarbonate. Specific examples of suitable poly(alkylene terephthalates) are poly(ethylene terephthalate) (PET), poly(1,4-butylene terephthalate) (PBT), poly(ethylene naphthanoate) (PEN), poly(butylene naphthanoate), (PBN), (polypropylene terephthalate) (PPT), polycyclohexanedimethanol terephthalate (PCT), and combinations comprising at least one of the foregoing polyesters. Also contemplated are the above polyesters with a minor amount, e.g., 0.5 to 10 percent by weight, of units derived from an aliphatic diacid and/or an aliphatic polyol to make copolyesters.

Copolymers comprising alkylene terephthalate repeating ester units with other ester groups can also be useful. Useful ester units can include different alkylene terephthalate units, which can be present in the polymer chain as individual units, or as blocks of poly(alkylene terephthalates). Specific examples of such copolymers include poly(cyclohexanedimethylene terephthalate)-co-poly(ethylene terephthalate), abbreviated as PETG where the polymer comprises greater than or equal to 50 mol % of poly(ethylene terephthalate), and abbreviated as PCTG where the polymer comprises greater than 50 mol % of poly(1,4-cyclohexanedimethylene terephthalate).

Poly(cycloalkylene diester)s can also include poly(alkylene cyclohexanedicarboxylate)s. Of these, a specific example is poly(1,4-cyclohexanedimethanol-1,4-cyclohexanedicarboxylate) (PCCD), having recurring units of formula (8):

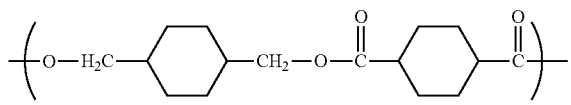

(8)

wherein, as described using formula (6), $R^2$ is a 1,4-cyclohexanedimethylene group derived from 1,4-cyclohexanedimethanol, and T is a cyclohexane ring derived from cyclohexanedicarboxylate or a chemical equivalent thereof, and can comprise the cis-isomer, the trans-isomer, or a combination comprising at least one of the foregoing isomers.

Another exemplary copolymer comprises polycarbonate blocks and polydiorganosiloxane blocks, also known as a polycarbonate-polysiloxane copolymer. The polycarbonate blocks in the copolymer comprise repeating structural units of formula (1) as described above, for example wherein $R^1$ is of formula (2) as described above. These units can be derived from reaction of dihydroxy compounds of formula (3) as described above.

The polydiorganosiloxane blocks comprise repeating structural units of formula (9) (sometimes referred to herein as 'siloxane'):

(9)

wherein each occurrence of R is same or different, and is a $C_{1-13}$ monovalent organic radical. For example, R can be a $C_1$-$C_{13}$ alkyl group, $C_1$-$C_{13}$ alkoxy group, $C_2$-$C_{13}$ alkenyl group, $C_2$-$C_{13}$ alkenyloxy group, $C_3$-$C_6$ cycloalkyl group, $C_3$-$C_6$ cycloalkoxy group, $C_6$-$C_{10}$ aryl group, $C_6$-$C_{10}$ aryloxy group, $C_7$-$C_{13}$ aralkyl group, $C_7$-$C_{13}$ aralkoxy group, $C_7$-$C_{13}$ alkaryl group, or $C_7$-$C_{13}$ alkaryloxy group. Combinations of the foregoing R groups can be used in the same copolymer. Generally, D can have an average value of 2 to 1000, specifically 2 to 500, more specifically 10 to 75. Where D is of a lower value, e.g., less than 40, it can be desirable to use a relatively larger amount of the polycarbonate-polysiloxane copolymer. Conversely, where D is of a higher value, e.g., greater than 40, it can be necessary to use a relatively lower amount of the polycarbonate-polysiloxane copolymer.

In one embodiment, the polydiorganosiloxane blocks are provided by repeating structural units of formula (10):

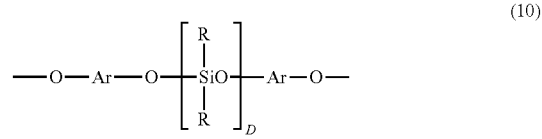

(10)

wherein D is as defined above; each R can be the same or different, and is as defined above; and Ar can be the same or different, and is a substituted or unsubstituted $C_6$-$C_{30}$ arylene radical, wherein the bonds are directly connected to an aromatic moiety. Suitable Ar groups in formula (10) can be derived from a $C_6$-$C_{30}$ dihydroxyarylene compound, for example a dihydroxyarylene compound of formula (3), (4), or (7) above. Combinations comprising at least one of the foregoing dihydroxyarylene compounds can also be used.

Such units can be derived from the corresponding dihydroxy compound of the following formula (11):

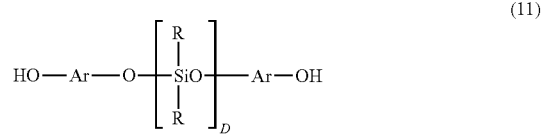

(11)

wherein Ar and D are as described above. Compounds of this formula can be obtained by the reaction of a dihydroxyarylene compound with, for example, an alpha, omega-bisacetoxypolydiorangonosiloxane under phase transfer conditions.

In another embodiment the polydiorganosiloxane blocks comprise repeating structural units of formula (12):

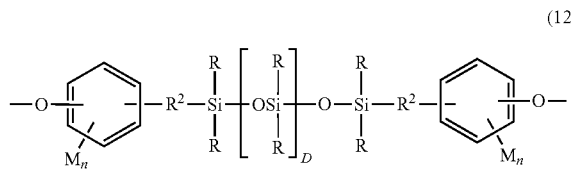
(12)

wherein R and D are as defined above. $R^2$ in formula (12) is a divalent $C_2$-$C_8$ aliphatic group. Each M in formula (12) can be the same or different, and can be cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkaryl, or $C_7$-$C_{12}$ alkaryloxy, wherein each n is independently 0, 1, 2, 3, or 4.

In one embodiment, M is an alkyl group such as methyl, ethyl, or propyl, an alkoxy group such as methoxy, ethoxy, or propoxy, or an aryl group such as phenyl, or tolyl; $R^2$ is a dimethylene, trimethylene or tetramethylene group; and R is a $C_{1-8}$ alkyl, haloalkyl such as trifluoropropyl, cyanoalkyl, or aryl such as phenyl or tolyl. In another embodiment, R is methyl, or a mixture of methyl and phenyl. In still another embodiment, M is methoxy, n is one, $R^2$ is a divalent $C_1$-$C_3$ aliphatic group, and R is methyl.

These units can be derived from the corresponding dihydroxy polydiorganosiloxane (13):

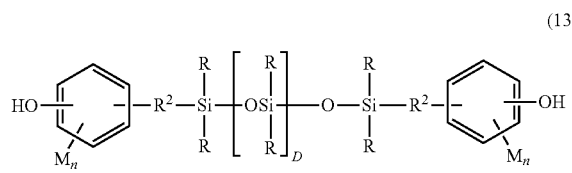
(13)

wherein R, D, M, $R^2$, and n are as described above.

Such dihydroxy polysiloxanes can be made by effecting a platinum catalyzed addition between a siloxane hydride of the formula (14),

(14)

wherein R and D are as previously defined, and an aliphatically unsaturated monohydric phenol. Suitable aliphatically unsaturated monohydric phenols included, for example, eugenol, 2-alkylphenol, 4-allyl-2-methylphenol, 4-allyl-2-phenylphenol, 4-allyl-2-t-butoxyphenol, 4-phenyl-2-phenylphenol, 2-methyl-4-propylphenol, 2-allyl-4,6-dimethylphenol, 2-allyl-6-methoxy-4-methylphenol and 2-allyl-4,6-dimethylphenol. Mixtures comprising at least one of the foregoing can also be used.

Suitable polycarbonates can be manufactured by processes known in the art, such as interfacial polymerization and melt polymerization. Although the reaction conditions for interfacial polymerization can vary, an exemplary process generally involves dissolving or dispersing a dihydric phenol reactant in aqueous caustic soda or potash, adding the resulting mixture to a suitable water-immiscible solvent medium, and contacting the reactants with a carbonate precursor in the presence of a suitable catalyst such as triethylamine or a phase transfer catalyst, under controlled pH conditions, e.g., 8 to 10. Generally, in the melt polymerization process, polycarbonates can be prepared by co-reacting, in a molten state, the dihydroxy reactant(s) and a diaryl carbonate ester, such as diphenyl carbonate, in the presence of a transesterification catalyst in a Banbury® mixer, twin screw extruder, or the like to form a uniform dispersion. Volatile monohydric phenol is removed from the molten reactants by distillation and the polymer is isolated as a molten residue.

In specific embodiments, the polycarbonate resin is derived from a dihydroxy compound having the structure of Formula (I):

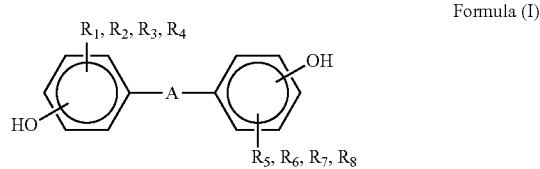
Formula (I)

wherein $R_1$ through $R_8$ are each independently selected from hydrogen, nitro, cyano, $C_1$-$C_{20}$ alkyl, $C_4$-$C_{20}$ cycloalkyl, and $C_6$-$C_{20}$ aryl; and A is selected from a bond, —O—, —S—, —SO$_2$—, $C_1$-$C_{12}$ alkyl, $C_6$-$C_{20}$ aromatic, and $C_6$-$C_{20}$ cycloaliphatic.

In specific embodiments, the dihydroxy compound of Formula (I) is 2,2-bis(4-hydroxyphenyl)propane (i.e. bisphenol-A or BPA). Other illustrative compounds of Formula (I) include: 2,2-bis(4-hydroxy-3-isopropylphenyl)propane; 2,2-bis(3-t-butyl-4-hydroxyphenyl)propane; 2,2-bis(3-phenyl-4-hydroxyphenyl)propane; 1,1-bis(4-hydroxyphenyl)cyclohexane; 4,4'dihydroxy-1,1-biphenyl; 4,4'-dihydroxy-3,3'-dimethyl-1,1-biphenyl; 4,4'-dihydroxy-3,3'-dioctyl-1,1-biphenyl; 4,4'-dihydroxydiphenylether; 4,4'-dihydroxydiphenylthioether; and 1,3-bis(2-(4-hydroxyphenyl)-2-propyl)benzene.

In more specific embodiments, the polycarbonate resin is a bisphenol-A homopolymer. The polycarbonate resin can have a weight average molecular weight (Mw) of 15,000 to 80,000 Daltons (Da), according to polycarbonate standards, including a range of 20,000 to 50,000 Daltons. Molecular weight can be measured by gel permeation chromatography (GPC) for example as in ASTM method D5296. The polycarbonate resin can be a linear or branched polycarbonate.

As previously explained above, the cleaning mixture comprises the alkyl aryl sulfonate salt, the polycarbonate resin pellets, and water. In some instances the cleaning mixture contains 70 wt % to 99.5 wt % of polycarbonate (PC) resin pellets with 0.5 to 30 wt % of a water solution comprising 10 to 40 wt % of at least one alkyl aryl sulfonate salt. Thus in some instances when a 10 wt % alkyl aryl sulfonate salt solution is used the cleaning mixture can comprise 99.5 wt % polycarbonate pellets, 0.05 wt % alkyl aryl sulfonate salt and 0.45 wt % water (a 99.5 wt % PC pellet mixture with 0.5 wt % of a 10 wt % alkylaryl sulfonate salt solution in water). When a 10 wt % aqueous alkyl aryl sulfonate salt solution is used with 70 wt % polycarbonate pellets the cleaning mixture can comprise 70 wt % PC pellets, 3 wt % sulfonate salt and 27 wt % water. When the cleaning mixture comprises a 40 wt % aqueous sulfonate salt solution the cleaning mixture with 99.5 wt % PC pellets the cleaning mixture can comprise 99.5 wt % PC pellets, 0.2 wt % sulfonate salt and 0.3 wt % water. In instances where a 40 wt % aqueous sulfonate salt solution is used in the cleaning mixture with 70 wt % PC pellets the cleaning mixture can comprise 70 wt % PC pellets, 12 wt % sulfonate salt and 18 wt % water. Thus in some instances the cleaning mixture composition using a 10 to 40 wt % aqueous sulfonate salt solution, can vary in an amount of 99.5 to 70 wt % polycarbonate pellets, 0.05 to 12 wt % alkyl aryl sulfonate salt and 0.3 to 27 wt % water. In yet other instances using a 20 to 30 wt % alkyl aryl sulfonate salt aqueous solution, the cleaning mixture composition can vary in an amount of 99 to 90 wt % polycarbonate pellets, 0.2 to 3 wt % alkyl aryl sulfonate salt and 0.7 to 8 wt % water.

In particular embodiments, the cleaning mixture consists essentially of the alkyl aryl sulfonate salt, the polycarbonate resin pellets, and water. Any impurities (e.g. carboxylic acid salts, fatty acid salts, amines, ammonium salts, carbonate salts, bicarbonate salts) are present in the amount of 50 ppm or less.

It should be noted that the cleaning mixture (purge) can either be formed outside of the mixing device or within the mixing device. For example, in some embodiments, the polycarbonate resin is added to the mixing device in the form of pellets. The alkyl aryl sulfonate salt can be separately added to the mixing device near or at the throat of the extruder, as an aqueous solution.

In the instance wherein the purge mixture is formed outside of the extruder, the polycarbonate pellets can be blended with the aqueous alkyl aryl sulfonate salt solution in any conventional mixing device. For example, paint shakers, vee-blenders, tumbler blends, such as drum tumblers, ribbon blenders, plowshare mixers, paddle mixers, double cone blenders, vertical cone screw blenders, static mixers, high intensity non fluxing mixers, such as a Henschel mixer or the like can be used to form the purge mixture. The PC pellets should be uniformly coated on all sides with the alkyl aryl sulfonate salt solution. In some specific instances, the PC pellet content will be 60 wt % to 95 wt % of the purge mixture, and the alkyl aryl sulfonate salt solution will be 5 wt % to 40 wt % of the purge mixture.

The use of an aqueous alkyl aryl sulfonate salt solution enhances the effectiveness of the purge while providing the advantage of using an inflammable solvent in the hot melt processing equipment. The water used in preparing the liquid soap solution is a safe and environmentally benign solvent.

The cleaning mixture is used to clean or purge mixing devices that can contain a first resin, prior to the device being used to make a second, different resin. For example, the mixing device can have first been used to make a polycarbonate of a first color, and is now being switched to make a polycarbonate of a second, different color. Any polymeric residue in the mixing device that has the first color can contaminate the polycarbonate having the second color.

The mixing device is contacted with the cleaning mixture (purge). The cleaning mixture is then run through the mixing device to remove the polymeric residue. Generally, the mixing device is heated to a temperature of 250° C. to 380° C. while the cleaning mixture is being run. The mixing device can be operated at a speed of 50 to 300 revolutions per minute (rpm) during the cleaning. In some instances the mixing device is run with the purge mixture for 1 minute to 20 minutes, or in other instances 5 minutes to 15 minutes. If desired, the cleaning run using the cleaning mixture can be followed by running a clean out resin through the mixing device. The clean out resin contains a polycarbonate resin with no alkyl aryl sulfonate salt additive. The cleaning mixture is then run with the clean out resin until free of contaminants (e.g. colorants, etc.). The clean out resin can be of any size, shape and source, for example powder, pellet, chunks, regrind, or any mixture thereof. The liquid purge mixture containing polycarbonate pellets and alkyl aryl sulfonate salt effects clean out of the extruders in a much shorter time than a liquid commercial high pH (pH greater than 9.0) detergent, such as WISK, coated onto PC pellets, and achieves this clean out with no significant decomposition of the purge PC resin. This allows the purge resin to be recycled.

In some instances liquid alkyl aryl sulfonate surfactant solution (with no pellets) is added to melt processing equipment, often a single or twin screw extruder, followed by polycarbonate pellets coated with 0.5 to 10 wt % of the aqueous sulfonate salt surfactant solution and the extruder is run at 50 to 300 rpm to effect efficient cleaning. In yet other instances the liquid aryl sulfonate surfactant solution is added an extruder at 25 to 150 rpm followed by pellets coated with 0.5 to 10 wt % of the aqueous alkyl aryl sulfonate salt solution and the extruder is run at 150 to 500 rpm.

In some instances the melt convening equipment, for example a compounding extruder, can have more than one feeding inlet. In certain instances said inlets are located in the first third of the extruder furthest from the exit die. In these situations in order to get more efficient cleaning it is advantageous for the inlet (or inlets) closer to the exit die to be plugged or otherwise closed when the aryl sulfonate surfactant coated pellets are fed into the inlet furthest from the exit die. In other instances with extruders having multiple feed inlets (ports) within the ⅓ of the extruder screw furthest from the die, coated pellets can be added to the feed zone closet to the die when plugs are not available. In yet other instances the coated pellet purge can be advantageously added to the feed inlet (feed port) where the colorants are added. Any inlet downstream (closer to the die) and still in the dry feeding/conveying section of the extruder screw (usually the first ⅓ of the extruder screw) furthest from the die can be plugged to prevent excessive foaming of the purge out of the nearby feed port. Vents in the extruder within the portion of the screw closest to the die, where a polymer melt has been established, usually do not need to be plugged. Note that plugging is an optional practice, the extruder can be purged with no plugs in place. Foaming is only an inconvenience making the liquid coated pellet purge less efficient.

In yet another version of the purging (cleaning) process for melt conveying equipment a first portion of alkyl aryl sulfonate salt coated pellets are fed into the extruder and run at a slower rate of 25 to 150 rpm followed by a second portion of aryl sulfonate surfactant coated pellets are fed into the extruder and run at a faster rate of 150 to 500 rpm. In some instances the coated pellets will comprise 0.5 to 10 wt % of an aqueous sulfonate salt solution having a pH of 6.0 to 7.9 and a concentration of 10 to 40 wt % of alkyl aryl sulfonate salt, the aqueous solution having a viscosity at 23° C. of 20 to 1000 centipoise, as measured by ASTM method D445.

In other instances the melt processing equipment can be purged (cleaned) using a first portion of an aqueous sulfonate salt solution as described above with no resin pellets, followed by a second portion of purge wherein the sulfonate salt solution is coated onto the resin pellet. In some instances the coated pellets will comprise 1 to 10 wt % of an aqueous sulfonate salt solution having a pH of 6.0 to 7.9, a concentration of 10 to 40 wt % of alkyl aryl sulfonate salt, the aqueous solution having a viscosity at 23° C. of 20 to 1000 centipoise, as measured by ASTM method D445.

In some instances, for example with a single screw extruder or injection molding machine using a single screw for melt conveying, if the coated pellet purge is too wet (too slippery), the coated purge pellets can tend to windmill (spin in the feed zone without being carried down the barrel by the screw). In other instances there can also be excessive foaming. These situations occur more often in single screw extruders when the pellet purge is prepared with greater than 10 wt % of the alkyl aryl sulfonate salt solution. In these instances the pellet purge was not efficiently conveyed by the single screw extruder of the molding machine. It was surprisingly found that a low level 0.2 to 5 wt %, specifically, 0.5 to 5 wt %, more specifically, 1 to 3 wt % of aqueous sulfonate salt solution coating the pellets was most effective in single screw extruders. Likewise, for use in a single screw extruder, a 20% sulfonate salt solution comprising only 0.2 to 0.6 wt % of alkyl aryl sulfonate salt can be present in the cleaning mixture. It is very surprising that such a very low level of alkyl aryl sulfonate salt in combination with polycarbonate pellet can be so effective in improving the cleaning of melt processing equipment.

It was previously considered that four different combinations of polycarbonate with alkyl aryl sulfonate salt could be made: (1) alkyl aryl sulfonate salt solution coated on PC pellets, (2) alkyl aryl sulfonate salt solution coated on PC powder, (3) solid alkyl aryl sulfonate salt powder on PC pellets; and (4) solid alkyl aryl sulfonate salt powder on PC powder. However, the combination of alkyl aryl sulfonate salt solution coated on PC pellets was surprisingly more effective than the other options as a purge or cleaning compound for screw driven melt processing equipment. The liquid mixture, particularly at a pH of 6.0 to 7.9, gives much faster removal of previously extruded resin residues and contaminants than the other three options listed above. A relatively thicker alkyl aryl sulfonate salt coated onto pellets can also be as effective as an aqueous solution. However, the aqueous alkyl aryl sulfonate salt solution should not be too viscous, which can hinder mixing with the pellets. The alkyl aryl sulfonate salt solution can have a viscosity at 23° C. of 20 to 1000 centipoise as measured by ASTM method D445.

This process of quickly purging polycarbonate blends without causing resin degradation is especially useful in changing over melt processing equipment from one color to another. Colorants that can be purged in the processes of the present disclosure include: Solvent Green 3, Solvent Green 28, Solvent Green 38, Pigment Green 50, Pigment Green 36, Solvent Red 52, Solvent Red 101, Solvent Red 111, Solvent Red 135, Solvent Red 169, Solvent Red 179, Solvent Red 207, Pigment Red 101, Disperse Red 22, Vat Red 41, Solvent Orange 60, Solvent Orange 63, Disperse Orange 47, Solvent Violet 13, Solvent Violet 14, Solvent Violet 36, Solvent Violet 50, Disperse violet 26/31, Pigment Blue 29, Pigment Blue 60, Copper Phthalocyanine Pigment Blue 15.4, Disperse Blue 73, Solvent Blue 97, Solvent Blue 101, Solvent Blue 104, Solvent Blue 122, Solvent Blue 138, Pigment Yellow 53, Pigment Yellow 138, Pigment Yellow 139, Disperse Yellow 201, Solvent Yellow 33, Solvent Yellow 114, Solvent Yellow 93, Solvent Yellow 98, Solvent Yellow 163, Solvent Yellow 160:1, Solvent Yellow 188, Pigment Brown 24, Amino Ketone Black, chrome oxides, carbon black, channel black, Pigment Black 6, zinc sulfide, zinc oxide, titanium dioxide ($TiO_2$), and mixtures thereof. Colorants having a high affinity for metal surfaces such as phthalocyanine and anthraquinone based pigments and dyes, carbon black, channel black and mixtures thereof can also be removed.

In some instances the $TiO_2$ colorant will be encapsulated by an inorganic shell comprising silica, alumina, silica alumina, or a mixture thereof wherein the inorganic shell is further passivated with a silicon compound, for example a silane (Si—H functionality) or an alkoxy silane compound or a mixture thereof. The $TiO_2$ can have a particle size of 0.05 to 10 micrometers. In other instances the $TiO_2$ particle size will be 0.1 to 1.0 micrometers.

The polycarbonate resin pellet(s) that is part of the cleaning mixture is run through the mixing device as part of the cleaning process. Upon exiting the device, this polycarbonate resin can be referred to as "purged" resin. This purged resin can be recovered for other uses or recycled. In embodiments, the purged resin will have a weight average molecular weight (Mw) that is within 30% of the Mw of the polycarbonate resin pellets (pre-purging). Put another way, the Mw of the purged resin is at least 70% of the Mw of the polycarbonate resin pellet(s) that was used in the cleaning mixture. The purged resin can also have a phenolic end group content of 100 ppm or less, and/or a halogen content of 100 ppm or less. In some embodiments, the initial polycarbonate resin pellet(s) used in the cleaning mixture has an initial Mw of 10,000 to 80,000 Daltons as determined by ASTM D5296 using polycarbonate calibration standards. In other instances the initial PC Mw will be 20,000 to 50,000 Daltons.

Halogen content, specifically bromine and chlorine content, can be determined by various methods known in the art, such as for example combustion analyses, mass spectroscopy, atomic emission spectroscopy, atomic absorption, inductively coupled plasma (ICP) and X-ray methods, such as x-ray fluorescence (XRF). Examples of such methods are ASTM methods D808, D6247 and D6349.

In particular embodiments of this process, the cleaning mixture is used to clean a mixing device containing residue from a prior polymer. The polycarbonate purge resin pellets desirably have a Mw that is at least 10% higher than the prior polymer. In particular embodiments, the prior polymer is a polycarbonate as well.

In a more detailed description, the purge operation is typically conducted by carrying out the following steps. The extrusion production by the extruder is stopped, i.e. the resin feed to the extruder is stopped and the extruder screw is run until the extruder seems empty of the preceding resin (which can be a polycarbonate or other polycarbonate containing polymeric resin). The extruder nozzle (extrusion head) which contains the extrusion die and filter, if any, may not need to be removed from the extruder. The temperature of the extruder can generally be maintained at the high operating temperature. The liquid cleaning mixture comprising polycarbonate resin pellet and alkyl aryl sulfonate salt can be fed into the feed hopper and screw inlet. The screw is operated to feed and compact the cleaning mixture as it traverses the length of the extruder barrel, practically forming a plug flow of the cleaning mixture as it exits the extruder, removing any polymeric residue (contaminants such as colorant residue, degraded resins, gels and black specks, carbon) and carrying this along with the exiting purged resin. The amount of cleaning mixture needed can be judged visually by the absence of contaminant and residue from the extruder. The purge compound can normally be followed with a clean out resin to convey all contaminants from the extruder. The subsequent polycarbonate can then be processed through the mixing device.

While not being constrained by any mechanism or mode of action, it is believed that the alkyl aryl sulfonate salt solution coated pellets can slide down the extruder screw further than other types of cleaning materials to reach the transition region of the melt processing equipment where most often there are the highest levels of deposit. The pellets are not completely melted but are in a solid or semi-solid or partially melted form allowing a scouring action. The alkyl aryl sulfonate salt allows further cleansing and lifting of colorants from metal surfaces, but with proper purity and pH does not cause degradation (loss of molecular weight) of the polycarbonate resin pellets. Loss of PC molecular weight reduces the melt viscosity and impedes cleaning and conveying to remove the contaminants from the machine screw and barrel.

The processes of the present disclosure are useful for preventing or reducing degradation of polycarbonates that are subsequently processed in the mixing device. The processes are also useful for polycarbonate blends, for instance those containing rubbery modifiers such as MBS and ABS and vinyl addition polymers such as SAN and PMMA. Exemplary rubber modifiers are methacrylate butadiene styrene (MBS), butadiene grafted with SAN, styrene butadiene block copolymers (SBS) hydrogenated styrene butadiene block copolymers (SEBS) as well as acrylic rubber, and acrylate styrene acrylonitrile (ASA) rubber. In yet other instances, the polycarbonate containing blend can also comprise mixtures with thermoplastic polyesters such as PET (polyethylene terephthalate), PBT (polybutylene terephthalate), (polypropylene terephthalate) (PPT), PCT (polycyclohexane dimethanol terephthalate), PEN (polyethylene naphthanoate) and PLA (polylactic acid) combinations comprising at least one of the foregoing polyesters. The polycarbonate polyester blends can further comprise rubbery modifiers such as MBS, ABS or mixtures thereof.

The cleaning mixture (alkyl aryl sulfonate salt liquid or solution and PC pellet) and clean out can be used after any colored resin or resin mixture containing polycarbonate to clean a mixing device. The cleaning mixture and clean out can also be used after a change in molecular species, for example cleaning out a brominated, chlorinated or phosphate containing polymers or copolymer or mixtures containing a brominated, chlorinated or phosphate additive prior to running a subsequent polymer through the mixing device. For example, the cleaning mixture can be used to clean a mixing device after extruding a brominated polycarbonate copolymer or a PC-ABS blend with triaryl phosphate. The cleaning and changeover can also be after polyester carbonates or silicone polycarbonate copolymers, or standard BPA polycarbonate homopolymer or blends are run through a mixing device.

The cleaning mixtures of the present disclosure offer some advantages over commonly used liquid detergents. Less resin is needed to purge the mixing device. The resin that is used for the purging process is less degraded, and so can be recovered or recycled for other uses. The mixing device can be run at a higher rate of extrusion. Clean up and change over takes less time, and most often can be accomplished without dismantling the equipment and removing the screw. This permits the mixing device, which represents a large capital investment, to be more available for manufacturing and production. The temperature of the mixing device is also retained and there is no foaming. By having the more efficient purging operations described herein there is less need to pull (remove) the melt conveying screw from the processing equipment, this not only saves time (making for a more efficient manufacturing operation) but reduces possible damage to the equipment during the screw pull. Also reduced screw pulls improves safety by reducing operator exposure to molten plastic, and possible fumes generated therefrom, during the removal and subsequent cleaning of the screw.

The purged PC resin generally shows good retention of Mw and limited degradation after extrusion, as evidenced by low phenolic end group concentration. In some instances, the purged resin has less than 100 ppm of phenolic OH content. The concentration of phenolic end groups can be analyzed by various titration and spectroscopic methods known in the art. Spectroscopic methods include infrared and nuclear magnetic resonance. It can be advantageous to make derivatives of polymer end groups to enhance measurement sensitivity using variations of methods as described in K. P. Chan et al., Macromolecules, vol. 27, p. 6731 (1994) and J. S. Chao, Polymer Bull., vol. 17, p. 397 (1987).

Set forth below are some embodiments of the process and cleaning mixture disclosed herein.

Embodiment 1

A process to clean melt processing equipment used to compound, mold or extrude polycarbonate-containing resins, comprising:
purging the melt processing equipment with a cleaning mixture (purge) comprising from 50 to 99.5 wt % of polycarbonate resin pellets and from 0.5 to 50 wt % of an aqueous solution containing an alkyl aryl sulfonate salt, wherein the alkyl aryl sulfonate salt is present in the solution in an amount of 0.2 to 50 wt % of the solution, the solution having a pH of 6.0 to 7.9;
heating the melt processing equipment to a temperature of 250 to 380° C.; and
running the equipment to obtain a purged resin while cleaning the melt processing equipment.

Embodiment 2

The process of Embodiment 1, wherein the alkyl aryl sulfonate salt is present in the solution at 5 to 50 wt % of the solution.

Embodiment 3

The process of any of Embodiments 1-2, further comprising: feeding a first portion of aryl sulfonate surfactant coated pellets into the melt processing equipment, wherein the melt processing equipment is run at a rate of 25 to 150 rpm; and feeding a second portion of aryl sulfonate surfactant coated pellets into the melt processing equipment, wherein the melt processing equipment is run at rate of 150 to 500 rpm. The coated pellets comprise 1 to 10 wt % of an aqueous sulfonate salt solution having a pH of 6.0 to 7.9, a concentration from 10 to 40 wt % of alkyl aryl sulfonate salt, the aqueous solution having a viscosity at 23° C. of 20 to 1000 centipoise, as measured by ASTM method D445.

Embodiment 4

The process of any of Embodiments 1-3, wherein the alkyl aryl sulfonate salt is added to the cleaning mixture as an aqueous solution with a pH of 6.0 to 7.0 and containing from 10 to 40 wt % of the alkyl aryl sulfonate salt.

Embodiment 5

The process of Embodiment 1, wherein the alkyl aryl sulfonate salt is present in the solution at 0.005 to 12 wt % of the solution.

Embodiment 6

The process of Embodiment 5, wherein the alkyl aryl sulfonate salt is present in the solution at 0.2 to 5 wt % of the solution.

Embodiment 7

The process of any of Embodiments 5-6, wherein the alkyl aryl sulfonate salt is present in the solution at 0.5 to 5 wt % of the solution.

Embodiment 8

The process of any of Embodiments 1-7, wherein the alkyl aryl sulfonate salt has one of the following structures:

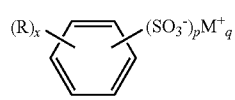
Formula (B)

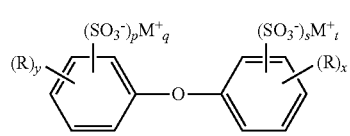
Formula (E)

wherein each M is an alkali metal or alkaline earth metal cation each R is independently alkyl having from 1 to 36 carbon atoms; x is 1 to 5; y is 0 to 5; p is 1 to 3; q is 1 to 3; s is 0 to 3; and t is 0 to 3.

Embodiment 9

The process of Embodiment 8, wherein x=1 and y=1.

Embodiment 10

The process of Embodiment 8, the alkyl aryl sulfonate salt has the structure of Formula (B) and wherein Formula (B) has the following structure:

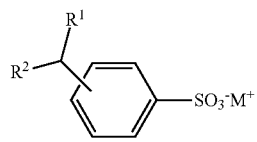
Formula (F)

where M is an alkali metal or alkaline earth metal cation; $R^1$ is an alkyl group containing from 5 to 35 carbon atoms; and $R^2$ is hydrogen or an alkyl group containing from 1 to 12 carbon atoms, with $R^1$ and $R^2$ having no more than 36 total carbon atoms.

Embodiment 11

The process of any of Embodiments 1-10, wherein the alkyl aryl sulfonate salt is an alkyl benzene sulfonate salt.

Embodiment 12

The process of any of Embodiments 1-11, wherein the purged resin has a weight average molecular weight (Mw) within 30% of the polycarbonate resin before purging and a phenolic end group content of 100 ppm or less.

Embodiment 13

The process of any of Embodiments 1-12, wherein the alkyl aryl sulfonate salt solution has 50 ppm or less of carboxylic acid salts, fatty acid salts, ammonium salts, amines, carbonate salts, bicarbonate salts, or a mixture thereof.

Embodiment 14

The process of any of Embodiments 1-13, wherein the melt processing equipment is contaminated with a colorant at least one of the following: Solvent Green 3, Solvent Green 28, Solvent Green 38, Pigment Green 50, Pigment Green 36, Solvent Red 52, Solvent Red 101, Solvent Red 111, Solvent Red 135, Solvent Red 169, Solvent Red 179, Solvent Red 207, Pigment Red 101, Disperse Red 22, Vat Red 41, Solvent Orange 60, Solvent Orange 63, Disperse Orange 47, Solvent Violet 13, Solvent Violet 14, Solvent Violet 36, Solvent Violet 50, Disperse Violet 26/31, Pigment Blue 29, Pigment Blue 60, Copper Phthalocyanine Pigment Blue 15.4, Disperse Blue 73, Solvent Blue 97, Solvent Blue 101, Solvent Blue 104, Solvent Blue 122, Solvent Blue 138, Pigment Yellow 53, Pigment Yellow 138, Pigment Yellow 139, Disperse Yellow 201, Solvent Yellow 33, Solvent Yellow 114, Solvent Yellow 93, Solvent Yellow 98, Solvent Yellow 163, Solvent Yellow 160:1, Solvent Yellow 188, Pigment Brown 24, Amino Ketone Black, chrome oxides, carbon black, channel black, Pigment Black 6, zinc sulfide, zinc oxide, titanium dioxide, and mixtures thereof.

Embodiment 15

The process of Embodiment 14, wherein the colorant comprises titanium dioxide, and the titanium dioxide is passivated with a silicone containing compound and has a particle size of 0.1 to 3.0 micrometers.

Embodiment 16

The process of any of Embodiments 1-15, wherein the melt processing equipment is an extruder with a length to diameter (L/D) ratio of 20:1 to 40:1, a screw diameter of 0.5 to 8.0 inches, and is run at a speed of 50 to 500 rpm at a temperature of 250 to 380° C.

Embodiment 17

The process of any of Embodiments 1-16, wherein the purged resin has 100 ppm or less of halogen.

Embodiment 18

The process of any of Embodiments 1-17, wherein the polycarbonate resin pellets in the cleaning mixture have a weight average molecular weight (Mw) at least 10% higher than a polycarbonate resin previously run in the melt processing equipment, wherein the Mw is determined by ASTM D5296 using polycarbonate standards.

Embodiment 19

The process of any of Embodiments 1-18, wherein the aqueous alkyl aryl sulfonate salt solution has a viscosity at 23° C. of 20 to 1000 centipoise as measured by ASTM method D445.

Embodiment 20

The process of any of Embodiments 1-19, wherein the polycarbonate resin pellets are cylinders with an average length of 2.0 to 6.0 mm and an average diameter of 0.5 to 4.0 mm.

Embodiment 21

The process of any of Embodiments 1-21, wherein the polycarbonate resin pellets have at least one angular face.

Embodiment 22

The process of Embodiment 20, and wherein surfaces defining the angular face meet at an angle of from 60 to 120 degrees.

Embodiment 23

The process of any of Embodiments 1-22, wherein the polycarbonate resin pellets have at least one angular face and wherein the surfaces defining the angular face meet at an angle of 80 to 100 degrees.

Embodiment 24

The process of any of Embodiments 1-23, wherein the polycarbonate resin pellets have a bulk density, as measured by ASTM method D1895, of 0.5 to 0.9 g/cc.

Embodiment 25

The process of any of Embodiments 1-24, wherein the polycarbonate resin pellets are a bisphenol-A homopolymer.

Embodiment 26

The process of any of Embodiments 1-10 or 12-25, wherein the alkyl aryl sulfonate salt contains more than one sulfonate group.

Embodiment 27

The process of any of Embodiments 1-26, wherein an aryl group of the alkyl aryl sulfonate salt is a phenyl, naphthyl, biphenyl, or diphenyl ether group.

Embodiment 28

The process of any of Embodiments 1-27, wherein the alkyl aryl sulfonate salt contains an alkali metal or an alkali earth metal.

Embodiment 29

The process of any of Embodiments 1-28, wherein the mixing device has a single screw for melt conveying.

Embodiment 30

The process of any of Embodiments 1-29, wherein the mixing device is a single screw extruder having a screw diameter from 0.5 to 8.0 inches that is part of a thermoplastic molding machine.

Embodiment 31

The process of any of Embodiments 29-30, wherein the single screw is part of a molding machine and is at least one of the following; an injection molding machine, a blow molding machine, an injection-blow molding machine, an extrusion-blow molding machine, a stretch-blow molding machine, a gas assist molding machine, a hydraulic molding machine, a mechanical molding machine and an electric molding machine.

Embodiment 32

The process of any of Embodiments 1-31, wherein the mixing device is an intermeshing twin screw extruder.

Embodiment 33

The process of any of Embodiments 1-32, wherein the aqueous solution is added to melt processing equipment followed by polycarbonate pellets coated with from 0.5 to 10% of the aqueous surfactant solution and the extruder is run at 50 to 500 rpm.

Embodiment 34

The process of any of Embodiments 1-33, wherein the aqueous solution is added to the melt processing equipment at 25 to 150 rpm followed by pellets coated with from 0.5 to 10% of the aqueous alkyl aryl sulfonate salt solution and the extruder is run at 150 to 300 rpm.

Embodiment 35

The process of any of Embodiments 1-34, wherein the melt processing equipment has more than one feeding inlet and the inlets are located in the first third of the extruder furthest from an exit die, wherein the inlets closest to the exit die are closed when the aryl sulfonate surfactant coated pellets are fed into the inlet furthest from the exit die.

Embodiment 36

The process of any of Embodiments 1-35, wherein the melt processing equipment has more than one feeding inlet and wherein the aqueous surfactant solution coated polycarbonate pellets are fed into at least one feed inlet wherein at least one colorant is added.

Embodiment 37

The process of any of Embodiments 1-36, wherein the pellets have a shape are other than spherical or ovoid.

Embodiment 38

The process of any of Embodiments 1-37, wherein the polycarbonate resin pellets have at least one angular face, and wherein surfaces defining the angular face meet at an angle of 80 to 100 degrees.

Embodiment 39. A cleaning mixture comprising: an alkyl aryl sulfonate salt, polycarbonate resin pellets, and water, wherein the mixture has a pH of 6.0 to 7.9.

Embodiment 40

The cleaning mixture of Embodiment 39, wherein the alkyl aryl sulfonate salt is sodium dodecyl benzene sulfonate.

Embodiment 41

The cleaning mixture of any of Embodiments 39-40, wherein the alkyl aryl sulfonate salt is present in the solution at 5 to 50 wt % of the solution.

Embodiment 42

The cleaning mixture of any of Embodiments 39-41, wherein the polycarbonate resin pellets are from 70.0 to 99.5 wt % of the cleaning mixture.

Embodiment 43

The cleaning mixture of any of Embodiments 39-42, wherein the water is present in an amount of 0.3 to 27.0 wt % of the cleaning mixture.

Embodiment 44

The cleaning mixture of any of Embodiments 39-43, wherein the pH is 6.0 to 7.0.

Embodiment 45

The cleaning mixture of any of Embodiments 39-44, wherein the alkyl aryl sulfonate salt and the water form an aqueous solution having a viscosity at 23° C. of 20 to 1000 centipoise as measured by ASTM method D445.

Embodiment 46

The cleaning mixture of any of Embodiments 39-45, wherein the polycarbonate resin pellets are cylinders with an average length of 2.0 to 6.0 mm and an average diameter of 0.5 to 4.0 mm.

Embodiment 47

The cleaning mixture of any of Embodiments 39-46, wherein the polycarbonate resin pellets have a bulk density, as measured by ASTM method D1895, of 0.5 to 0.9 g/cc.

Embodiment 48

The cleaning mixture of any of Embodiments 39-47, wherein the polycarbonate resin pellets have at least one angular face.

Embodiment 49

The cleaning mixture of Embodiment 48, wherein surfaces defining the angular face meet at an angle of 60 to 120 degrees.

Embodiment 50

The cleaning mixture of any of Embodiments 48-49, wherein surfaces defining the angular face meet at an angle of 80 to 100 degrees.

Embodiment 51

The cleaning mixture of any of Embodiments 39-50, wherein the alkyl aryl sulfonate salt is present in an amount of 0.005 wt % to 12 wt % of the cleaning mixture.

Embodiment 52

The cleaning mixture of any of Embodiments 39-51, wherein the alkyl aryl sulfonate salt is present in the solution at 0.2 to 5 wt % of the solution.

Embodiment 53

The cleaning mixture of any of Embodiments 39-52, wherein the alkyl aryl sulfonate salt is present in the solution at 0.5 to 5 wt % of the solution.

Embodiment 54

The cleaning mixture of any of Embodiments 39-50, wherein the alkyl aryl sulfonate salt is added to the cleaning mixture as an aqueous solution with a pH of 6.0 to 7.0 and containing from 10 to 40 wt % of the alkyl aryl sulfonate salt.

Embodiment 55

The cleaning mixture of any of Embodiments 39-53, wherein the alkyl aryl sulfonate salt has one of the following structures:

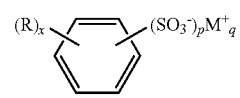

Formula (B)

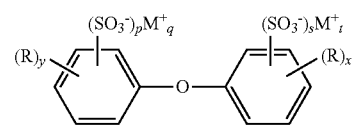

Formula (E)

wherein each M is an alkali metal or alkaline earth metal cation each R is independently alkyl having from 1 to 36 carbon atoms; x is 1 to 5; y is 0 to 5; p is 1 to 3; q is 1 to 3; s is 0 to 3; and t is 0 to 3.

Embodiment 56

The cleaning mixture of Embodiment 55, wherein x=1 and y=1.

Embodiment 57

The cleaning mixture of Embodiment 55, the alkyl aryl sulfonate salt has the structure of Formula (B) and wherein Formula (B) has the following structure:

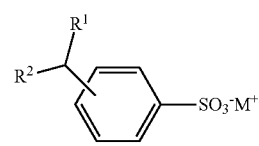

Formula (F)

where M is an alkali metal or alkaline earth metal cation; $R^1$ is an alkyl group containing from 5 to 35 carbon atoms; and $R^2$ is hydrogen or an alkyl group containing from 1 to 12 carbon atoms, with $R^1$ and $R^2$ having no more than 36 total carbon atoms.

Embodiment 58

The cleaning mixture of any of Embodiments 39-57, wherein the alkyl aryl sulfonate salt is an alkyl benzene sulfonate salt.

Embodiment 59

The cleaning mixture of any of Embodiments 39-58, wherein the alkyl aryl sulfonate salt solution has 50 ppm or less of carboxylic acid salts, fatty acid salts, ammonium salts, amines, carbonate salts, bicarbonate salts, or a mixture thereof.

Embodiment 60

The cleaning mixture of any of Embodiments 39-59, wherein the melt processing equipment is contaminated with a colorant at least one of the following: Solvent Green 3, Solvent Green 28, Solvent Green 38, Pigment Green 50, Pigment Green 36, Solvent Red 52, Solvent Red 101, Solvent Red 111, Solvent Red 135, Solvent Red 169, Solvent Red 179, Solvent Red 207, Pigment Red 101, Disperse Red 22, Vat Red 41, Solvent Orange 60, Solvent Orange 63, Disperse Orange 47, Solvent Violet 13, Solvent Violet 14, Solvent Violet 36, Solvent Violet 50, Disperse Violet 26/31, Pigment Blue 29, Pigment Blue 60, Copper Phthalocyanine Pigment Blue 15.4, Disperse Blue 73, Solvent Blue 97, Solvent Blue 101, Solvent Blue 104, Solvent Blue 122, Solvent Blue 138, Pigment Yellow 53, Pigment Yellow 138, Pigment Yellow 139, Disperse Yellow 201, Solvent Yellow 33, Solvent Yellow 114, Solvent Yellow 93, Solvent Yellow 98, Solvent Yellow 163, Solvent Yellow 160:1, Solvent Yellow 188, Pigment Brown 24, Amino Ketone Black, chrome oxides, carbon black, channel black, Pigment Black 6, zinc sulfide, zinc oxide, titanium dioxide, and mixtures thereof.

Embodiment 61

The cleaning mixture of Embodiment 60, wherein the colorant comprises titanium dioxide, and the titanium dioxide is passivated with a silicone containing compound and has a particle size of 0.1 to 3.0 micrometers.

Embodiment 62

The cleaning mixture of any of Embodiments 39-61, wherein the aqueous alkyl aryl sulfonate salt solution has a viscosity at 23° C. of 20 to 1000 centipoise as measured by ASTM method D445.

Embodiment 63

The cleaning mixture of any of Embodiments 39-62, wherein the polycarbonate resin pellets are cylinders with an average length of 2.0 to 6.0 mm and an average diameter of 0.5 to 4.0 mm.

Embodiment 64

The cleaning mixture of any of Embodiments 39-63, wherein the polycarbonate resin pellets have a bulk density, as measured by ASTM method D1895, of 0.5 to 0.9 g/cc.

Embodiment 65

The cleaning mixture of any of Embodiments 39-64, wherein the polycarbonate resin pellets are a bisphenol-A homopolymer.

Embodiment 66

The cleaning mixture of any of Embodiments 39-57 or 59-65, wherein the alkyl aryl sulfonate salt contains more than one sulfonate group.

Embodiment 67

The cleaning mixture of any of Embodiments 39-66, wherein an aryl group of the alkyl aryl sulfonate salt is a phenyl, naphthyl, biphenyl, or diphenyl ether group.

Embodiment 68

The cleaning mixture of any of Embodiments 39-67, wherein the alkyl aryl sulfonate salt contains an alkali metal or an alkali earth metal.

The following examples are provided to illustrate the processes of the present disclosure. The examples are merely illustrative and are not intended to limit the disclosure to the materials, conditions, or cleaning mixture parameters set forth therein. Examples of the invention are designated by number, comparative examples are noted by letter.

EXAMPLES

Comparative Example A

Four kilograms (kg) of a maroon colored polycarbonate blend was extruded on a 30 mm intermeshing twin screw extruder at 500 to 570 degrees Fahrenheit (° F.) (260 to 299° C.) at 450 rpm. This polycarbonate served as the prior polymer that leaves residue in the extruder. The formulation of the polycarbonate is provided below in Table 1 the composition is presented in parts per hundred (pph). The $TiO_2$ (CAS #13463-67-7) had an average particle size of 0.2 micrometer and had about 1.5 wt % of a silica alumina shell passivated with about 1.5 wt % of a silicon hydrogen fluid (DF1040 from Momentive Co.).

TABLE 1

| Maroon PC Formulation | |
|---|---|
| Ingredient | pph |
| Polycarbonate Mw about 23,000 Da | 100 |
| Titanium Dioxide | 0.3 |
| Solvent Red 135 | 0.5 |
| Solvent Yellow 163 | 0.0025 |
| Solvent Orange 60 | 0.165 |
| Pigment Blue 15:4 | 0.075 |

After the run, a purge mixture was made from 2000 grams (g) of LEXAN 101 polycarbonate pellets (Mw about 28,000 Da) coated with 300 grams of a commercial liquid detergent (WISK from the Proctor & Gamble Co.). The detergent had a pH of 10. The extruder was then purged with about 2300 grams of the WISK coated pellet mixture (purge) and then cleaned out with a Lexan HF polycarbonate resin powder (Mw about 21,000 Da) with no additive. After the purge was run through the extruder, samples of the clean out resin were collected over the next 10 minutes (min).

When the purge mixture containing commercial detergent was run, it gave a foamy degraded resin extrudate and blob. The blob was of such low molecular weight it could be broken into pieces. The throughput was approximately 30% lower than the previously run maroon polycarbonate and the temperature of the extruder was reduced by 20 to 50° F. (−6.7 to 10° C.). The extruder was not deemed clean enough to proceed to the next run. When followed by the LEXAN HF powder (clean out), only after 30 minutes was almost all of the resin color finally removed and the machine deemed clean enough to proceed to the next run.

Example 1

Another 4 kg of the colored resin of Table 1 was run under identical conditions described in Comparative Example A. The extruder was then loaded with 2000 grams of LEXAN 101 polycarbonate pellets coated in a paint shaker with 300 grams of a mixture of 100 grams sodium dodecyl benzene sulfonate (also known as sodium sulfo 2-ethyl hexyl benzene, CAS number 25155-30-0 from Acros Chemical, 88% neutralized) that had been dissolved in 200 milliliters (mL) of deionized water (about 33 wt %). The sodium dodecyl benzene sulfonate (SDBS) solution had a pH of 6.5 and a viscosity at 25° C. of about 70 centistokes. The PC pellets had an average length of about 4 mm and a diameter of 1.5 mm and a bulk density of 0.70 g/cc prior to coating. The cylindrical purge pellets had an angular face from about 80 to 100 degrees. When the aqueous SDBS PC pellet mixture was run, it gave no foaming, no drop in throughput, and no reduction in extruder temperature. The blobs were tough and could not be broken, indicative of retained PC Mw. When followed by LEXAN HF polycarbonate powder clean out resin, after about only 10 minutes, all of the resin color was removed and the machine was deemed ready to proceed to the next run.

The SDBS PC pellet purge of Example 1 had the machine ready to run in less than half the time of Comparative Example A. The purged resin recovered was of high quality and could be recovered for other uses. Table 2 shows the Mw of the purged resin and the LEXAN HF resin run immediately after the purge. As can be seen, the Mw of the polycarbonate resin pellets in Comparative Example A dropped from 28,000 to 14,975 Da. In contrast, the purge resin of Example 1 had almost no drop in Mw (Mw was 27,697 Da).

In both Comparative Example A and Example 1, the extruder was then run with a clean out resin (LEXAN™ HF). The clean out resin had a Mw of about 21,000 Da prior to extrusion. When the clean out resin was started after the WISK purge (Comparative Example A), it showed a lower Mw of 17,954 Da. As can be seen in Table 2, it took about 9 minutes to reach the 21,000 Da Mw which indicated that there was no more decomposition. However, even though the drop in Mw had leveled off, the resin was still too highly colored for the extruder to be judged clean. On the other hand, Example 1 showed no significant Mw drop in either the purged resin (Mw=27,697 Da) or in the clean out resin run right after the purge. The 1 min sample had a Mw of 21,261 Da.

TABLE 2

PC Maroon Color Purge Mw.

| | Comparative Example A Wisk PC Mw (Da) | Example 1 SBDS PC Mw (Da) |
|---|---|---|
| Purge Start clean out | 14975 | 27697 |
| 1 min | 17954 | 21261 |
| 2 min | 17285 | 21162 |
| 3 min | 17773 | 21141 |
| 4 min | 17706 | 21157 |
| 5 min | 18501 | 21148 |
| 7 min | 19713 | 21412 |
| 9 min | 21459 | 21676 |
| 12 min | 21636 | 21522 |

The samples collected in Table 2 were further analyzed by dissolving a 0.1 gram sample in 5.0 mL methylene chloride and measuring the absorbance in the visible spectrum at 470 nanometers (nm). As can be seen in Table 3, the SDBS purge of Example 1 had a higher purge color (0.885 absorbance units (abs)), indicating more colorant removal from the extruder than the comparative commercial detergent of Comparative Example A (0.657 abs). As the HF-PC clean out commenced, the SDBS purge (Example 1) showed a much faster drop in 470 nm absorbance than Comparative Example A. After 4 minutes, the SDBS absorption (Example 1) was only 0.008. This supported the visual observation that the SDBS-PC pellet purge of Example 1 cleaned up the extruder faster than the purge of Comparative Example A.

TABLE 3

Absorbance at 470 nm.

| | Purge | 1 min HF-PC | 2 min HF-PC | 3 min HF-PC | 4 min HF-PC |
|---|---|---|---|---|---|
| Comparative Example A WISK purge | 0.657 | 0.393 | 0.089 | 0.102 | 0.018 |
| Example 1 SDBS Purge | 0.885 | 0.108 | 0.053 | 0.052 | 0.008 |

The clean out resin run for 1, 2 and 3 minutes following the purge in Example 1 and Comparative Example A were analyzed for phenolic OH end groups. Phosphorus functionalization of the polycarbonate end groups, was used to characterize the resins. A sample was dissolved in $CDCl_3$ (deutero chloroform) with pyridine and chromium (III) AcAc (acetylacetonate); trichlorophenol was used as a standard. The active phosphorylating agent, which derivatized the phenolic OH group functionality into phosphorus containing species, was o-phenylene phosphorochloridite (CAS #1641-40-3). The resin solutions were allowed to react for at least 15 minutes, converted into their phosphorus derivatives and analyzed by NMR (nuclear magnetic resonance). Phosphorus 31 isotope signals were observed and quantified against the trichloro phenol standard. The phenolic end group derivative absorptions were at about 125.8 ppm.

Table 4 shows the samples following the commercial detergent (WISK) purge (Comparative Example A) had OH end groups above 1000 ppm while the SBDS purge (Example 1) had much lower phenolic OH ends, below 100 ppm, and just slightly above the unextruded HF-PC clean out resin powder value of about 30 ppm.

TABLE 4

| | PPM Total Phenolic OH end groups | |
|---|---|---|
| Total OH ppm | Example 1 SDBS Purge | Comparative Example A WISK Purge |
| 1 min | 55 | >1000 |
| 2 min | 42 | >1000 |
| 3 min | 52 | >1000 |
| HF PC powder | 30 | |

Comparative Example B 4 kg of the colored resin of Table 1 was run under identical conditions described in Comparative Example A. 300 grams of 33 wt % aqueous SDBS solution was coated onto 2000 grams of LEXAN 101 polycarbonate powder rather than pellets. In this combination, while there was no degradation of the Mw of the PC powder, the SDBS solution mixture with PC powder was not as effective in cleaning the colorants from the extruder as the SDBS solution mixed with PC pellets (Example 1), taking more than twice as long to have the machine judged clean enough to proceed to the next run.

Comparative Example C 4 kg of the colored resin of Table 1 was run under identical conditions described in Comparative Example A. 100 grams of SBDS powder was shaken with 2000 grams of LEXAN 101 polycarbonate pellets and run as a purge mixture, which was followed by a HF-PC powder as a clean out resin. There was no degradation in the purged resin, which retained its Mw, but the powder/pellet mixture was much less effective in removing colored residue from the extruder, taking more than twice as long to remove all visual traces of color than the combination of aqueous SBDS solution coated onto PC pellets of Example 1.

Comparative Example D and Example 2

A brown polycarbonate formulation, having the composition shown in Table 5, was run under the same extrusion conditions as Comparative Example A on a 30 mm intermeshing twin screw extruder. In addition to colorants, this formation also had an optical brightener and used a higher Mw polycarbonate where kDa is kiloDaltons.

TABLE 5

| PC-Brown. | |
|---|---|
| Ingredient | pph |
| Polycarbonate Mw 29 kDa | 100.00 |
| Passivated TiO2 | 1.00 |
| Solvent Green 3 | 0.50 |
| Solvent Red 135 | 0.50 |
| Carbon Black | 0.50 |
| Optical Brightener Uvitex OB1 | 0.01 |

Two purge mixtures were compared for cleaning of this brown colored PC formulation.

Comparative Example D used 300 grams of the commercial liquid detergent (WISK) coated onto 2000 grams of LEXAN 101 polycarbonate pellets. Example 2 used 300 grams of a 33 wt % aqueous SDBS solution coated onto 2000 grams of LEXAN 101 polycarbonate pellets. The PC pellets had an average length of about 4 mm and a diameter of 1.5 mm and a bulk density of 0.70 g/cc prior to coating. The cylindrical purge pellets had an angular face from about 80 to 100 degrees.

After the about 2300 g of purge mixture was run through the extruder, a clean out was run with LEXAN 100 polycarbonate powder containing no additive. The level of residual titanium (ppm Ti) and sodium (ppm Na) in the clean out resin was measured by inductively coupled plasma mass spectrometry (ICP-MS) on samples that had been digested with a mixture of hydrofluoric and nitric acid heated in a microwave. The Ti and Na content reflected how much colorant remained in the resin. As can be seen in Table 6 the SDBS pellet purge mixture (Example 2) was much more effective in cleaning the extruder than the commercial detergent coated pellet purge mixture (Comparative Example D) by reducing the level (ppm) of titanium and sodium faster than the commercial detergent pellet purge mixture.

TABLE 6

| | | PC-Brown ppm Ti & Na. | | |
|---|---|---|---|---|
| Example | Metal | 2 min. after purge (ppm) | 6 min. after purge (ppm) | 10 min. after purge (ppm) |
| Comparative Example D | Ti | 62.3 | 20.0 | 3.8 |
| Example 2 | Ti | 5.5 | 1.6 | 0.9 |
| Comparative Example D | Na | 69.4 | 21.9 | 12.3 |
| Example 2 | Na | 18.3 | 3.8 | 0.8 |

The samples taken during the first ten minutes of the PC clean out resin run after purge were also analyzed for optical brightener (OB=UVITEX OB, a bis benzoxazoyl thiophene from Ciba Co) by dissolving the pellet samples in methylene chloride and analyzing using a GPC-fluorescence method with excitation (Ex) at 250 nm, and emission (Em) at 410 nm. The OB content was measured in ppm. Table 7 shows that with the SDBS pellet purge mixture of Example 2, the OB content is lower at the start and drops off much faster with time than the sample of Comparative Example D.

Three minutes after the clean out run is started, the OB content is less than 1 ppm with the SDBS pellet purge mixture (Example 2). After 9 minutes the OB, which is very sensitive to detection due its high florescence, is not detectable (nd) at all in example 2.

TABLE 7

| PC Brown Color Clean Out. | | |
|---|---|---|
| | Comparative Example D (ppm OB) | Example 2 (ppm OB) |
| Start clean out | 1912 | 1285 |
| 2 min | 15.7 | 1.1 |
| 3 min | 11.6 | 0.8 |
| 4 min | 9.5 | 0.7 |
| 5 min | 5.5 | 0.6 |
| 6 min | 3.4 | 0.3 |
| 7 min | 1.8 | 0.2 |
| 8 min | 1.7 | 0.1 |
| 9 min | 1.1 | nd |
| 10 min | 0.5 | nd |

Examples 3 & 4 and Comparative Examples E & F

The next set of experiments was directed to the cleanup of a 58 mm Werner Pfleiderer (WP) intermeshing twin screw extruder after extruding a green or a black colored polyester carbonate copolymer (ITR20/80) which was blended with a bisphenol-A (BPA) polycarbonate homopolymer. The polyester carbonate copolymer contained 20 mole % ITR linkages and 80 mole % BPA carbonate linkages. The ITR linkages were formed from resorcinol and a 1:1 mole ratio of isophthalate and terephthalate. The two formulations are shown in Tables 8 and 9. In addition to different colorants, both had an added benzotriazole UV absorber (UVA=TINUVIN 234 from Ciba Co.) in addition to a pentaerythritol tetra stearate (PETS) mold release, a phosphonate stabilizer (PEPQ), a cyclohexyl diepoxide and a potassium sulfone sulfonate flame retardant salt.

TABLE 8

ITR-Green.

| Ingredient | pph |
|---|---|
| ITR 20/80 | 45.00 |
| Polycarbonate Mw 21 kDa | 54.38 |
| PEPQ phosphonite | 0.06 |
| ERL epoxide | 0.03 |
| Potassium sulfone sulfonate | 0.03 |
| PETS | 0.30 |
| Benzotriazole UVA | 0.20 |
| Passivated TiO2 | 0.0025 |
| Carbon black | 0.00006 |
| Pigment Brown 24 | 0.35 |
| Pigment Green 36, phthalocyanine | 0.1401 |
| Solvent Yellow 163 | 0.022 |

TABLE 9

ITR-Black.

| Ingredient | pph |
|---|---|
| ITR 20/80 | 45.00 |
| Polycarbonate | 54.38 |
| PEPQ phosphonite | 0.06 |
| ERL epoxide | 0.03 |
| Potassium sulfone sulfonate | 0.03 |
| PETS | 0.30 |
| Benzotriazole UVA | 0.20 |
| Solvent Green 3 | 0.13 |
| Solvent Red 135 | 0.13 |

A purge mixture was made comprising 4000 grams LEXAN 101 polycarbonate pellets coated with 500 grams of a 33 wt % aqueous sodium dodecyl benzene sulfonate solution with a pH 6.5. The PC pellets had an average length of about 3 to 6 mm and a diameter of 1 to 3 mm and a bulk density of 0.75 g/cc prior to coating. The cylindrical purge pellets had an angular face from about 80 to 100 degrees.

In Example 3, the about 4500 grams of purge mixture was run after extruding the black resin of Table 9, followed by a clean out with PC powder (Mw about 25,000 Da) run at 100-300 rpm and 580° F. (304° C.). The extruder was clean in less than 15 minutes. After running about 185 pounds (lb) (84 kg) of clean out resin there was no visible trace of the original black color.

In Example 4, the about 4500 grams of purge mixture was run after extruding the green resin of Table 8, followed by a clean out with PC powder (Mw about 25,000 Da) run at 100 to 300 rpm and 580° F. (304° C.). The extruder was clean in less than 15 minutes. After running about 185 lb (84 kg) of clean out resin there was no visible trace of the original green color.

For the comparative examples, a control purge mixture was made using an alkaline commercial detergent (pH 10) with PC powder (Mw 25,000 Da).

In Comparative Example E, the control purge mixture was run after extruding the black resin of Table 9, followed by a clean out with LEXAN 100 polycarbonate powder. It took over 3 hours (hr) and about 600 lb (272 kg) of PC clean out resin to reach the same level of cleanliness as Example 3.

In Comparative Example F, the control purge mixture was run after extruding the green resin of Table 8, followed by a clean out with LEXAN 100 polycarbonate powder. It took over 3 hours and about 600 lb (272 kg) of PC clean out resin to reach the same level of cleanliness as Example 4.

Example 5 and Comparative Example G

A methacrylate butadiene styrene (MBS) rubber blend of polycarbonate and polybutylene terephthalate (PBT) with a brown color package was extruded on a 92 mm intermeshing twin screw extruder. The formulation is shown in Table 10. In addition to several colorants, the formulation further contained hindered phenol and thio ester antioxidants, benzotriazole UV stabilizer, and a 45 wt % aqueous phosphorous acid melt stabilizer to prevent transesterification of the PC and PBT.

TABLE 10

PC-PBT-MBS-Brown.

| Ingredient | pph |
|---|---|
| Polycarbonate Mw 25 kDa | 55.25 |
| PBT 315 | 35.80 |
| MBS rubber | 8.00 |
| Hindered Phenol | 0.20 |
| Thioester | 0.20 |
| Benzotriazole UVA | 0.50 |
| 45% aq. $H_3PO_3$ | 0.05 |
| Passivated $TiO_2$ | 0.015 |
| Pigment Green 50, cobalt titanate | 0.418 |
| Pigment Brown 24 | 0.209 |
| Pigment Red 10, iron oxide | 0.213 |
| Pigment chrome oxide | 0.437 |

After the brown PC-PBT-MBS blend was extruded, the extruder was run until no more resin emerged.

For Example 5, the extruder was purged with 15,000 grams LEXAN 101 polycarbonate pellets coated with 2000 grams of a 33 wt % aqueous solution of sodium dodecyl benzene sulfonate (SDBS). At 150 rpm with a temperature of 570° F. (299° C.) the purge was run through the extruder removing much of the remaining colorants, additives, PBT polyester and MBS rubber from the extruder. The extruder was then run with a PC powder clean out resin. In less than 30 minutes, the extruder was clean and ready to run a different material.

For Comparative Example G, the purge mixture was a poly methyl methacrylate purging compound, which was followed by a PC powder clean out. This cleaning mixture took over 6 hours, and with this specific color, often would not give an acceptably clean machine, requiring that the die and screw be removed from the extruder and manually cleaned. This manual cleaning mixture led to at least 4 additional hours out of production. In addition, the poly methyl methacrylate purge gave objectionable fumes at the 300° C. to 350° C. melt processing temperature.

Example 6

A high heat N-phenyl phenolphthalein bis phenol BPA polycarbonate copolymer was blended with linear BPA polycarbonates, a white color package comprising a silica alumina coated and silane fluid passivated titanium dioxide, a hindered phenol and triaryl phosphite stabilizer combination with a pentaerythritol tetra stearate (PETS) mold release agent, and a benzotriazole UV absorber, and was extruded on a 1.75 inch vacuum vented STERLING single screw extruder at 570 to 640° F. (299 to 338° C.), 120 rpm, at a rate of 60 lb/hr (27 kg/hr). The formulation is shown in Table 11.

TABLE 11

High Heat PC UVA White.

| Ingredient | pph |
| --- | --- |
| BPA Polycarbonate powder Mw 22 kDa | 9.00 |
| BPA Polycarbonate powder Mw 30 kDa | 9.00 |
| 35 mole % N-phenol phenolphthalein bisphenol BPA PC Mw 25 kDa | 82.00 |
| Hindered Phenol Antioxidant (IRGANOX 1076) | 0.04 |
| Triaryl phosphite stabilizer (IRGAPHOS 168) | 0.08 |
| PETS mold release | 0.27 |
| UV absorber (TINUVIN 234) | 0.27 |
| Passivated $TiO_2$ | 1.90 |
| Carbon Black | 0.00019 |
| Solvent Green 38 | 0.00007 |
| Solvent Red 52 | 0.00015 |
| Solvent Blue 104 | 0.00028 |

For Example 6, the extruder was purged with 2,000 grams LEXAN 131 high Mw (about 37 kDa) polycarbonate pellets coated with 150 grams of a 33 wt % aqueous solution (pH=6.5) of sodium dodecyl benzene sulfonate (SDBS) at 20 rpm with a temperature of 570 to 640° F. (299 to 338° C.). The polycarbonate pellets had a bulk density of 0.72 g/cc prior to coating. The cylindrical purge pellets had an angular face about 80 to 100 degrees. The PC pellets had an average length of about 4 to 6 mm and a diameter of 2 to 3 mm and a bulk density of 0.70 g/cc prior to coating. The purge mixture was run through the extruder removing much of the remaining colorants, and additives from the extruder. After feeding the about 2,150 grams of purge mixture through the throat of the extruder, the extruder was then run with a PC powder (Mw 30 kDa) clean out resin at 60 lb/hr (27 kg/hr). In less than 10 minutes, the extruder was clean and ready to run a different material. In contrast, a typical run using just the PC powder clean out resin would take 2 to 4 hours to clean the single screw extruder.

The purge mixture of Example 6 contained about 7 wt % of the aqueous solution (i.e. 150/2,150). It was found that using a low level of the aqueous solution coated onto the PC pellets (i.e. about 3 to 8 wt % of aqueous solution) was more effective in feeding the purge to the single screw extruder. A higher level (greater than 10 wt % of aqueous solution) of liquid on the pellets gave a mixture that sat in the throat of the extruder and did not convey down the screw (a situation sometimes referred to as "windmilling"). In this instance the aqueous solution contained 33% SDBS by weight. The solution had a pH of 6.5.

Example 7

A non brominated FR polycarbonate was blended with a very heavy (25 wt %) loading of a silica alumina coated and silane fluid passivated titanium dioxide, a triaryl phosphite stabilizer a pentaerythritol tetra stearate (PETS) mold release agent, a potassium perfluorobutane sulfonate salt flame retardant, and a polystyrene acrylonitrile (SAN) encapsulated poly tetra fluoro ethane (PTFE) anti dripping agent (TSAN), and was extruded on a 30 mm intermeshing Werner Pfleiderer (WP) vacuum vented twin screw extruder at about 550 to 575° F. (288 to 302° C.) at 400 rpm at a rate of 60 lb/hr (27 kg/hr). The formulation is shown in Table 12.

TABLE 12

FR PC High Loading White.

| Ingredient | pph |
| --- | --- |
| BPA Polycarbonate powder Mw 22 kDa | 63.00 |
| BPA Polycarbonate powder Mw 30 kDa | 11.00 |
| Triaryl phosphite stabilizer (IRGAPHOS 168) | 0.06 |
| PETS mold release | 0.70 |
| Potassium perfluorobutane sulfonate (FR salt) | 0.60 |
| SAN encapsulated PTFE (TSAN FR antidrip) | 0.50 |
| Passivated TiO2 | 25.00 |

For Example 7, the extruder was purged with 2,000 grams LEXAN 131 high Mw (about 37 kDa) polycarbonate pellets coated with 300 grams of a 33 wt % aqueous solution (pH=6.5) of sodium dodecyl benzene sulfonate (SDBS). The PC pellets had an average length of about 4 mm and a diameter of 1.5 mm and a bulk density of 0.70 g/cc prior to coating. The cylindrical purge pellets had an angular face about 80 to 100 degrees. The about 2,300 grams of purge mixture was run through the extruder at 100 rpm with a temperature of 550 to 575° F. (288 to 302° C.), removing much of the remaining titanium dioxide and flame retardants from the extruder. The extruder was then run with a PC powder (Mw 30K) clean out resin at 60 lb/hr (27 kg/hr), 450 rpm. In less than 10 minutes, the extruder was clean and ready to run a different material. Even the very heavy (25 wt %) loading of titanium dioxide had been removed. A typical run using just the PC powder clean out resin would take 2 to 4 hours to clean the single screw extruder.

Example 8 and Comparative Example H

A 133 mm co-rotating intermeshing twin screw extruder with a L/D of 35 was used to make an uncolored low gloss PC-ABS blend of 61.35 wt % polycarbonate, 17.0 wt % styrene acrylonitrile (SAN), 15.9 wt % of a styrene butadiene rubber grafted with SAN (BLENDEX 360), 5.0 wt % of a gloss reducing agent made from SAN a sulfonic acid and a polyepoxide such as dicyclohexyl epoxide ERL4221 (CAS #37042-87-8) as described in U.S. Pat. No. 5,536,780, with 0.3 wt % of a triaryl phosphite, 0.3 wt % di-tert-butyl hindered phenol and 0.15 wt % a pentaerythritol tetra stearate mold release agent. The standard procedure (Comparative Example H) for preparing the extruder for production of the PC-ABS blend was to purge with a 30,000 Da Mw PC powder for 1 hour. After this type of cleaning/purging the resultant PC-ABS resin suffered from contamination from black specks. The resultant PC-ABS resin was collected in 2000 lb (907 kg) boxes, 52% of the boxes were rejected due to the presence of at least 10 pellets showing black specks selected from 2 lb (0.9 kg) of resin (from each box) inspected for 2 minutes in a light box using a magnifying glass. This test is referred to as the visual inspection rating (VIR) test.

In a second experiment (Example 8) the same extruder was prepared for processing the same PC-ABS blend using 60 lb (27 kg) of a purge compound made by coating 48 lb (22 kg) of polycarbonate pellets (Mw=36,500 Da) on a paint shaker for 1 minute with 10 wt % of a 20 wt % aqueous solution of the sodium salt of a $C_{10}$ to $C_{16}$ alkyl benzene sulfonic acid (CAS #68081-81-2). The cylindrical purge pellets had an angular face about 80 to 100 degrees with an average length of about 4 mm and a diameter of 1.5 mm and a bulk density of 0.70 g/cc prior to coating. The alkyl aryl sulfonate salt solution coated PC pellet purge was run through the extruder at 100 rpm at 500 to 560° F. (260 to 293° C.) followed by PC powder for only 10 minutes. Production of the aforementioned PC-ABS blend was conducted under the same conditions as used previously. In this instance the rejects due to black specks using the VIR test was only 7% an improvement of 45% over the PC powder purge. This improved PC-ABS blend quality as well as machine usage. With a 93% yield of black speck free resin there was no need to remove, clean and polish the screw, which would have taken at least three hours during which the machine would be idle. The alkyl aryl sulfonate salt solution coated PC pellet purge provided an improvement in quality as well as a saving of both resin (less purging) and machine production time.

Example 9 and Comparative Example I

A 6.5 inch single screw extruder with a L/D of 30 was used to make a gray 20 wt % fiber glass filled polycarbonate (GF-PC) with 0.05 wt % of a triaryl phosphite, and 0.3 wt % a pentaerythritol tetra stearate mold release agent. Colorants were 0.0033 wt % of a 0.26 micrometer, silica encapsulated, silane passivated $TiO_2$, 0.0018 wt % carbon black, 0.0009 wt % pigment red 101, 0.0009 wt % solvent blue 104, and 0.0003 wt % pigment brown 24. The standard procedure (Comparative Example I) for preparing the extruder for production of the next GF-PC blend was to purge with a 30,000 Da Mw PC powder for 2 hours until the extruder was clean enough to switch to a white colored 10% GF-PC, colorant comprising 1.76 wt % $TiO_2$, 0.0016 wt % carbon black, 0.00044 wt % pigment blue 27, 0.00084 wt % solvent violet 36 and 0.05 wt % diphenyl dodecyl phosphite. In a second experiment (Example 9) the same extruder was prepared after processing the same gray 10% GF-PC blend as described in Comparative Example I and cleaned using 50 lb (23 kg) of a purge compound made by coating 45 lb (20 kg) of 10 wt % glass filled uncolored polycarbonate pellets (Mw=30,000 Da) on a paint shaker for 1 minute with 5 wt % of a 25 wt % aqueous solution of the dodecyl benzene sodium salt (CAS #25155-30-0). The GF-PC pellets of the purge compounds comprise 10 wt % fiber glass wherein the E-glass fibers had a 14 micrometer diameter and were coated with a polyolefin sizing that had poor adhesion to the PC resin matrix (a non-bonding glass). The alkyl aryl sulfonate salt solution coated GF-PC pellet purge was run through the extruder at 80 rpm at 500 to 560° F. (260 to 293° C.) followed by PC powder for only 10 minutes. The extruder was then used to make the white 10% GF PC resin. The switch from the gray to white GF-PC resin was much faster (less than half the time) than the purge with no aqueous alkyl aryl sulfonate surfactant coated GF-PC pellets, and there was no degradation of the PC resin.

Examples 10, 11 and Comparative Example J

A 85 ton Van Dorn hydraulic single screw injection molding machine with a screw having a L/D of 20 and diameter of a 35 mm was used to mold a polycarbonate resin comprising the following ingredients (wt. %): 98.9% BPA-PC, 0.6% brominated PC (50% TBrBPA-50% BPA PC copolymer), 0.15% potassium sulfone sulfonate FR salt, 0.1% triaryl phosphite stabilizer (IRGAFOS 168), 0.15% pentaerythritol tetrastearate mold release, and colorants comprising; 0.012 wt % carbon black, 0.02 wt % titanium dioxide with a particle size of 2.5 micrometers encapsulated in a 1.5% silica shell and passivated with 1.0% silicone hydride fluid DF1040, 0.015 wt % pigment green 36, 0.035 wt % solvent violet 36, 0.015 wt % solvent blue 104 and 0.002 wt % solvent yellow 163. Resin was dried for 4 hrs at 125° C. and ASTM test parts were molded at 285 to 300° C. using a 35 second (sec) cycle comprising a 6 sec injection with a 10 sec hold time. Mold temperature was 85° C. In Comparative Example J after the molding was finished the machine was run until no more resin was conveyed from the barrel and was then purged with (about 5 kg) a clear uncolored polycarbonate (LEXAN 141) pellets. The dry uncolored PC was run for about 45 minutes to mold clear parts with no haze or residue from the previously run colored material. The injection molding machine was judged clean and ready to run the next material.

In Example 10 after another set of parts were molded on the same machine using the same material and settings as Comparative Example J. The injection molding machine was purged with 1000 g of a high molecular weight (36,500 Da Mw) PC (LEXAN 135) pellets coated with 1 wt % (10 g) of a 20 wt % aqueous sodium alkyl benzene sulfonate (pH about 6.5). The pellets were cylindrical with a diameter of about 2 to 3 mm and a length of about 4 to 6 mm. The cut face had an angle of about 80 to 100 degrees. The pellets had a bulk density of about 0.7 g/cc before coating. After just 15 minutes the alkyl benzene sulfonate salt coated pellet purge was very effective in cleaning the molding machine removing the previously run colored material as well as black specks and gels that had built up on the screw. This was a 67% reduction in cleaning time of the molding machine and an 80% reduction in the amount of purge resin need to clean the injection molding machine.

Note that if the coated pellet purge was too wet, that is prepared with greater than 10 wt % of the alkyl benzene sulfonate salts solution, the purge pellets tended to windmill (spin in the feed zone without being carried down the screw) sometimes with excessive foaming and were not efficiently conveyed down the barrel by the single screw extruder of the molding machine. A low level of aqueous sulfonate salt solution coating (0.5 to 3 wt %) was most effective in single screw extruders.

In another experiment (Example 11) after the same molding machine, running the same colored PC, was purged using the uncoated clear Lexan 141 pellets of the Comparative Example J. The molding machine, judged to be "clean", was then run with 1000 g of the 1 wt % aqueous alkyl benzene sulfonate salt coated PC pellets of Example 10 (10 g solution coated over 1000 g pellets in a paint shaker). During the 15 min purge (cleaning) the coated pellet purge of the injection molding machine that had been judged "clean" by visual inspection of the molded parts, showed additional purging of black specks and other contaminants that had not been removed from the screw by the cleaning of the Comparative Example J. Thus the aqueous alkyl benzene sulfonate salt coated pellet purge had removed contaminants that might have broken out later during subsequent molding cycles giving contaminated parts that would be rejected and scrapped.

The present disclosure has been described with reference to exemplary embodiments. Obviously, modifications and alterations will occur to others upon reading and understanding the preceding detailed description. It is intended that the present disclosure be construed as including all such modifications and alterations insofar as they come within the scope of the appended claims or the equivalents thereof.

The invention claimed is:

1. A process to clean melt processing equipment used to compound, mold or extrude polycarbonate-containing resins, comprising:
   purging the melt processing equipment with a cleaning mixture (purge) comprising from 50 to 99.5 wt % of polycarbonate resin pellets and from 0.5 to 50 wt % of an aqueous solution containing an alkyl aryl sulfonate salt, wherein the alkyl aryl sulfonate salt is present in the solution in an amount of 0.2 to 50 wt % of the solution, the solution having a pH of 6.0 to 7.9;

heating the melt processing equipment to a temperature of 250 to 380° C.; and running the equipment to obtain a purged resin while cleaning the melt processing equipment.

2. The process of claim 1, wherein the alkyl aryl sulfonate salt is present in the solution at 5 to 50 wt % of the solution.

3. The process of claim 1, further comprising feeding a first portion of aryl sulfonate surfactant coated pellets into the melt processing equipment, wherein the melt processing equipment is run at a rate of 25 to 150 rpm; and feeding a second portion of aryl sulfonate surfactant coated pellets into the melt processing equipment, wherein the melt processing equipment is run at rate of 150 to 500 rpm;

wherein the coated pellets comprise 1 to 10 wt % of an aqueous sulfonate salt solution having a pH of 6.0 to 7.9, a concentration from 10 to 40 wt % of alkyl aryl sulfonate salt, the aqueous solution having a viscosity at 23° C. of 20 to 1000 centipoise, as measured by ASTM method D445.

4. The process of claim 1, wherein the alkyl aryl sulfonate salt is added to the cleaning mixture as an aqueous solution with a pH of 6.0 to 7.0 and containing from 10 to 40 wt % of the alkyl aryl sulfonate salt.

5. The process of claim 1, wherein the alkyl aryl sulfonate salt is present in the solution at 0.1 to 9 wt % of the solution.

6. The process of claim 5, wherein the alkyl aryl sulfonate salt is present in the solution at 0.2 to 5 wt % of the solution.

7. The process of claim 5, wherein the alkyl aryl sulfonate salt is present in the solution at 0.5 to 5 wt % of the solution.

8. The process of claim 1, wherein the alkyl aryl sulfonate salt has one of the following structures:

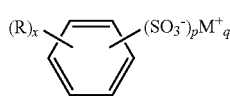

Formula (B)

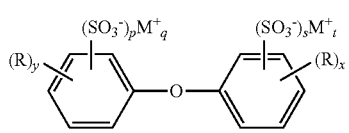

Formula (E)

wherein each M is an alkali metal or alkaline earth metal cation each R is independently alkyl having from 1 to 36 carbon atoms; x is 1 to 5; y is 0 to 5; p is 1 to 3; q is 1 to 3; s is 0 to 3; and t is 0 to 3.

9. The process of claim 8, wherein x=1 and y=1.

10. The process of claim 8, the alkyl aryl sulfonate salt has the structure of Formula (B) and wherein Formula (B) has the following structure:

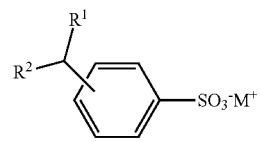

Formula (F)

where M is an alkali metal or alkaline earth metal cation; $R^1$ is an alkyl group containing from 5 to 35 carbon atoms; and $R^2$ is hydrogen or an alkyl group containing from 1 to 12 carbon atoms, with $R^1$ and $R^2$ having no more than 36 total carbon atoms.

11. The process of claim 1, wherein the alkyl aryl sulfonate salt is an alkyl benzene sulfonate salt.

12. The process of claim 1, wherein the purged resin has a weight average molecular weight (Mw) within 30% of the polycarbonate resin before purging and a phenolic end group content of 100 ppm or less.

13. The process of claim 1, wherein the alkyl aryl sulfonate salt solution has 50 ppm or less of carboxylic acid salts, fatty acid salts, ammonium salts, amines, carbonate salts, bicarbonate salts, or a mixture thereof.

14. The process of claim 1, wherein the melt processing equipment is contaminated with a colorant at least one of the following: Solvent Green 3, Solvent Green 28, Solvent Green 38, Pigment Green 50, Pigment Green 36, Solvent Red 52, Solvent Red 101, Solvent Red 111, Solvent Red 135, Solvent Red 169, Solvent Red 179, Solvent Red 207, Pigment Red 101, Disperse Red 22, Vat Red 41, Solvent Orange 60, Solvent Orange 63, Disperse Orange 47, Solvent Violet 13, Solvent Violet 14, Solvent Violet 36, Solvent Violet 50, Disperse Violet 26/31, Pigment Blue 29, Pigment Blue 60, Copper Phthalocyanine Pigment Blue 15.4, Disperse Blue 73, Solvent Blue 97, Solvent Blue 101, Solvent Blue 104, Solvent Blue 122, Solvent Blue 138, Pigment Yellow 53, Pigment Yellow 138, Pigment Yellow 139, Disperse Yellow 201, Solvent Yellow 33, Solvent Yellow 114, Solvent Yellow 93, Solvent Yellow 98, Solvent Yellow 163, Solvent Yellow 160:1, Solvent Yellow 188, Pigment Brown 24, Amino Ketone Black, chrome oxides, carbon black, channel black, Pigment Black 6, zinc sulfide, zinc oxide, titanium dioxide, and mixtures thereof.

15. The process of claim 14, wherein the colorant comprises titanium dioxide, and the titanium dioxide is passivated with a silicone containing compound and has a particle size of 0.1 to 3.0 micrometers.

16. The process of claim 1, wherein the melt processing equipment is an extruder with a length to diameter (L/D) ratio of 20:1 to 40:1, a screw diameter of 0.5 to 8.0 inches, and is run at a speed of 50 to 500 rpm at a temperature of 250 to 380° C.

17. The process of claim 1, wherein the purged resin has 100 ppm or less of halogen.

18. The process of claim 1, wherein the polycarbonate resin pellets in the cleaning mixture have a weight average molecular weight (Mw) at least 10% higher than a polycarbonate resin previously run in the melt processing equipment, wherein the Mw is determined by ASTM D5296 using polycarbonate standards.

19. The process of claim 1, wherein the aqueous alkyl aryl sulfonate salt solution has a viscosity at 23° C. of 20 to 1000 centipoise as measured by ASTM method D445.

20. The process of claim 1, wherein the polycarbonate resin pellets are cylinders with an average length of 2.0 to 6.0 mm and an average diameter of 0.5 to 4.0 mm.

21. The process of claim 1, wherein the polycarbonate resin pellets have at least one angular face.

22. The process of claim 21, and wherein surfaces defining the angular face meet at an angle of from 60 to 120 degrees.

23. The process of claim 1, wherein the polycarbonate resin pellets have at least one angular face and wherein the surfaces defining the angular face meet at an angle of 80 to 100 degrees.

24. The process of claim 1, wherein the polycarbonate resin pellets have a bulk density, as measured by ASTM method D1895, of 0.5 to 0.9 g/cc.

25. The process of claim 1, wherein the polycarbonate resin pellets are a bisphenol-A homopolymer.

26. The process of claim 1, wherein the alkyl aryl sulfonate salt contains more than one sulfonate group.

27. The process of claim 1, wherein an aryl group of the alkyl aryl sulfonate salt is a phenyl, naphthyl, biphenyl, or diphenyl ether group.

28. The process of claim 1, wherein the alkyl aryl sulfonate salt contains an alkali metal or an alkali earth metal.

29. The process of claim 1, wherein the mixing device has a single screw for melt conveying.

30. The process of claim 29, wherein the single screw is part of a molding machine and is at least one of the following; an injection molding machine, a blow molding machine, an injection-blow molding machine, an extrusion-blow molding machine, a stretch-blow molding machine, a gas assist molding machine, a hydraulic molding machine, a mechanical molding machine and an electric molding machine.

31. The process of claim 1, wherein the mixing device is a single screw extruder having a screw diameter from 0.5 to 8.0 inches that is part of a thermoplastic molding machine.

32. The process of claim 1, wherein the mixing device is an intermeshing twin screw extruder.

33. The process of claim 1, wherein the aqueous solution is added to melt processing equipment followed by polycarbonate pellets coated with from 0.5 to 10% of the aqueous surfactant solution and the extruder is run at 50 to 500 rpm.

34. The process of claim 1, wherein the aqueous solution is added to the melt processing equipment at 25 to 150 rpm followed by pellets coated with from 0.5 to 10% of the aqueous alkyl aryl sulfonate salt solution and the extruder is run at 150 to 300 rpm.

35. The process of claim 1, wherein the melt processing equipment has more than one feeding inlet and the inlets are located in the first third of the extruder furthest from an exit die, wherein the inlets closest to the exit die are closed when the aryl sulfonate surfactant coated pellets are fed into the inlet furthest from the exit die.

36. The process of claim 1, wherein the melt processing equipment has more than one feeding inlet and wherein the aqueous surfactant solution coated polycarbonate pellets are fed into at least one feed inlet wherein at least one colorant is added.

37. A cleaning mixture comprising: an alkyl aryl sulfonate salt, polycarbonate resin pellets, and water, wherein the mixture has a pH of 6.0 to 7.9.

38. The cleaning mixture of claim 37, wherein the alkyl aryl sulfonate salt is sodium dodecyl benzene sulfonate.

39. The cleaning mixture of claim 37, wherein the alkyl aryl sulfonate salt is present in an amount of 0.005 wt % to 12 wt % of the cleaning mixture.

40. The cleaning mixture of claim 37, wherein the polycarbonate resin pellets are from 70.0 to 99.5 wt % of the cleaning mixture.

41. The cleaning mixture of claim 37, wherein the water is present in an amount of 0.3 to 27.0 wt % of the cleaning mixture.

42. The cleaning mixture of claim 37, wherein the pH is 6.0 to 7.0.

43. The cleaning mixture of claim 37, wherein the alkyl aryl sulfonate salt and the water form an aqueous solution having a viscosity at 23° C. of 20 to 1000 centipoise as measured by ASTM method D445.

44. The cleaning mixture of claim 37, wherein the polycarbonate resin pellets are cylinders with an average length of 2.0 to 6.0 mm and an average diameter of 0.5 to 4.0 mm.

45. The cleaning mixture of claim 37, wherein the polycarbonate resin pellets have a bulk density, as measured by ASTM method D1895, of 0.5 to 0.9 g/cc.

46. The cleaning mixture of claim 37, wherein the polycarbonate resin pellets have at least one angular face.

47. The cleaning mixture of claim 46, wherein surfaces defining the angular face meet at an angle of 60 to 120 degrees.

48. The cleaning mixture of claim 46, wherein surfaces defining the angular face meet at an angle of 80 to 100 degrees.

* * * * *